United States Patent
Yamaguchi et al.

(10) Patent No.: US 8,900,078 B2
(45) Date of Patent: Dec. 2, 2014

(54) BICYCLE DERAILLEUR

(71) Applicants: Sota Yamaguchi, Osaka (JP); Atsuhiro Emura, Osaka (JP)

(72) Inventors: Sota Yamaguchi, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/645,404

(22) Filed: Oct. 4, 2012

(65) Prior Publication Data

US 2013/0090196 A1  Apr. 11, 2013

Related U.S. Application Data

(63) Continuation-in-part of application No. 13/253,427, filed on Oct. 5, 2011.

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *B62M 9/122* | (2010.01) |
| *B62M 9/1244* | (2010.01) |

(52) U.S. Cl.
CPC ............ *B62M 9/122* (2013.01); *B62M 9/1244* (2013.01)
USPC .............................................. 474/80; 474/82

(58) Field of Classification Search
CPC .... B62M 9/122; B62M 9/123; B62M 9/1242; B62M 9/1248; B62M 9/125; B62M 9/126; B62M 9/127; B62M 25/08
USPC ...................................................... 474/80, 82
See application file for complete search history.

(56) References Cited

U.S. PATENT DOCUMENTS

| | | | |
|---|---|---|---|
| 4,406,643 A | 9/1983 | Shimano | |
| 4,822,322 A * | 4/1989 | Martin | 474/135 |
| 5,052,982 A * | 10/1991 | Ouchi | 474/135 |
| 6,135,904 A * | 10/2000 | Guthrie | 474/82 |
| 6,945,888 B2 | 9/2005 | Fukuda et al. | |
| 6,949,040 B2 | 9/2005 | Ando | |
| 6,997,835 B2 * | 2/2006 | Fukuda | 474/82 |
| 7,980,974 B2 | 7/2011 | Fukuda | |
| 8,025,597 B2 | 9/2011 | Takamoto | |
| 8,202,182 B2 * | 6/2012 | Ishikawa et al. | 474/82 |
| 8,602,929 B2 * | 12/2013 | Ishikawa et al. | 474/82 |
| 2004/0063528 A1 * | 4/2004 | Campagnolo | 474/70 |
| 2004/0116221 A1 * | 6/2004 | Fukuda | 474/82 |
| 2005/0176536 A1 * | 8/2005 | Matsumoto et al. | 474/78 |
| 2007/0219029 A1 * | 9/2007 | Turner | 474/80 |

(Continued)

FOREIGN PATENT DOCUMENTS

| | | |
|---|---|---|
| EP | 1415902 A2 | 5/2004 |
| EP | 2128014 A1 | 1/2009 |

*Primary Examiner* — Henry Liu
(74) *Attorney, Agent, or Firm* — Global IP Counselors

(57) ABSTRACT

A bicycle derailleur basically includes a base member, a movable member, a chain guide, a friction element and a motor. The base member is configured to be mounted to a bicycle. The movable member is movably coupled to the base member. The chain guide is coupled to the movable member to rotate around a rotational axis with respect to the movable member. The friction element is operatively arranged between the movable member and the chain guide to frictionally provide rotational resistance in a first rotational direction of the chain guide. The motor is operatively coupled to the movable member to move the movable member with respect to the base member.

12 Claims, 17 Drawing Sheets

(56) References Cited

U.S. PATENT DOCUMENTS

| | | | |
|---|---|---|---|
| 2008/0026890 A1* | 1/2008 | Oseto | 474/82 |
| 2008/0026891 A1* | 1/2008 | Oseto | 474/82 |
| 2009/0054183 A1* | 2/2009 | Takachi et al. | 474/80 |
| 2009/0291789 A1* | 11/2009 | Ishikawa et al. | 474/82 |
| 2012/0083371 A1* | 4/2012 | Yamaguchi et al. | 474/80 |
| 2012/0083372 A1* | 4/2012 | Yamaguchi et al. | 474/80 |
| 2012/0258827 A1* | 10/2012 | Ishikawa et al. | 474/80 |
| 2013/0203532 A1* | 8/2013 | Jordan | 474/82 |

\* cited by examiner

BICYCLE DERAILLEUR

CROSS-REFERENCE TO RELATED APPLICATIONS

This application is a continuation-in-part application of U.S. patent application Ser. No. 13/253,427 filed on Oct. 5, 2011. The entire disclosure of U.S. patent application Ser. No. 13/253,427 is hereby incorporated herein by reference.

BACKGROUND

1. Field of the Invention

This invention generally relates to controlling multiple bicycle operating characteristics. More specifically, the present invention relates to various features of an apparatus for controlling multiple bicycle operating characteristics and in particular, a bicycle derailleur.

2. Background Information

Bicycles have several operating components. For example, a bicycle transmission may comprise a plurality of front sprockets and a plurality of rear sprockets, wherein the plurality of front sprockets are mounted for rotation with the pedals, and the plurality of rear sprockets are mounted for rotation with the rear wheel. To change the gear ratio of the bicycle transmission, a front derailleur switches a chain to engage the various front sprockets, and a rear derailleur switches the chain to engage the various rear sprockets. Because the length of chain needed to engage a particular combination of front and rear sprockets changes depending upon the chosen sprocket combination, the chain must be long enough to engage the largest front sprocket and the largest rear sprocket, and some mechanism must be provided to take up the slack in the chain when the chain engages a smaller sprocket combination. Conventionally, the rear derailleur is provided with a chain guide that includes an upper guide sprocket and a lower tension sprocket, and the chain guide is spring-biased to rotate to take up the slack in the chain.

When the bicycle is ridden over rough terrain, the resulting shocks and vibrations may overcome the biasing force of the chain guide spring, and the chain guide may rotate in the chain loosening direction. Such undesirable rotation increases the risk that the chain derails from the currently-engaged sprocket and/or becomes caught between adjacent sprockets. To overcome such problems, various motion damping mechanisms for the chain guide have been developed. For example, U.S. Patent Application Publication No. 2012/0083371 titled "Bicycle Derailleur With Rotation Resistance" discloses a bicycle derailleur that comprises a base member, a movable member movably coupled to the base member, and a chain guide coupled to the movable member for rotation around a rotational axis. A resistance applying element applies resistance to rotational movement of the chain guide, and a resistance control element is operatively coupled to the resistance applying element so that the resistance applying element applies different first and second resistances to rotational movement of the chain guide when the resistance control element is disposed in respective first and second positions.

Some bicycles include front and/or rear suspension elements. The front suspension element typically comprises a pair of shock absorbers that form opposite portions of the legs of the front wheel fork, and the rear suspension element typically comprises a shock absorber with one end mounted to the front portion of the frame and another end mounted to a pivoting rear swing arm that supports the rear wheel. In any case, the shock absorber usually comprises an outer tubular suspension member and an axially telescoping inner tubular suspension member. A piston has an outer peripheral surface that sealingly and slidably engages the inner peripheral surface of the inner tubular suspension member to form a compression chamber in which a compressible fluid such as air is disposed. The piston is coupled to the outer tubular suspension member by a piston rod. Some shock absorbers include separate chambers disposed on opposite sides of the piston so that further operating parameters, such as ride height or stroke, may be controlled.

Some shock absorbers are constructed to allow the rider to vary several operating parameters to accommodate varying riding conditions. Such parameters include spring preload (for shock absorbers that use a coil spring), compression damping (to control the rate of shock absorber retraction), rebound damping (to control the rate of shock absorber extension), platform damping (to damp oscillation of the shock absorber caused by pedaling forces), cylinder pressure, cylinder volume, and lockout (the ability to turn the normal shock absorbing function on and off).

Bicycles usually also include adjustable seats. A typical bicycle seat comprises a saddle mounted to a seat post. The seat post is dimensioned to be inserted into a seat tube of the bicycle frame, and a clamp is used to clamp the seat tube around the seat post and thereby hold the saddle at a desired height. Some bicycles include an electric motor with a gear that engages gear teeth on the seat post in order to electrically adjust the saddle height and maintain the saddle at a desired height.

SUMMARY

Generally, the present disclosure discloses to various features of an apparatus for controlling multiple bicycle operating characteristics. In one feature, a bicycle derailleur is provided that includes a friction element is operatively arranged between a movable member and a chain guide to frictionally provide rotational resistance in a first rotational direction of the chain guide.

Also in one aspect, a bicycle operating characteristic control apparatus comprises a first bicycle component and a second bicycle component, wherein the second bicycle component is changeable from a first status to a second status. The first bicycle component includes a base member for coupling to a bicycle frame, a movable member coupled for movement relative to the base member, and a chain guide coupled to the movable member for guiding a chain among a plurality of sprockets in response to movement of the movable member. A biasing device provides a biasing force to the chain guide for tensioning the chain, and a rotation resistance changing device changes a rotational resistance of the chain guide relative to the movable member. The first bicycle component and the second bicycle component are operatively coupled so that rotational resistance of the chain guide changes in conjunction with a change of status of the second bicycle component. Additional inventive features will become apparent from the description below, and such features may be combined with the above features to provide additional benefits.

In another aspect, a bicycle derailleur is provided that basically comprises a base member, a movable member, a chain guide, a friction element and a motor. The base member is configured to be mounted to a bicycle. The movable member is movably coupled to the base member. The chain guide is coupled to the movable member to rotate around a rotational axis with respect to the movable member. The friction element is operatively arranged between the movable member and the chain guide to frictionally provide rotational resistance in a first rotational direction of the chain guide. The motor is operatively coupled to the movable member to move the movable member with respect to the base member.

Other objects, features, aspects and advantages of the disclosed bicycle derailleur will become apparent to those skilled in the art from the following detailed description, which, taken in conjunction with the annexed drawings, discloses preferred embodiments of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
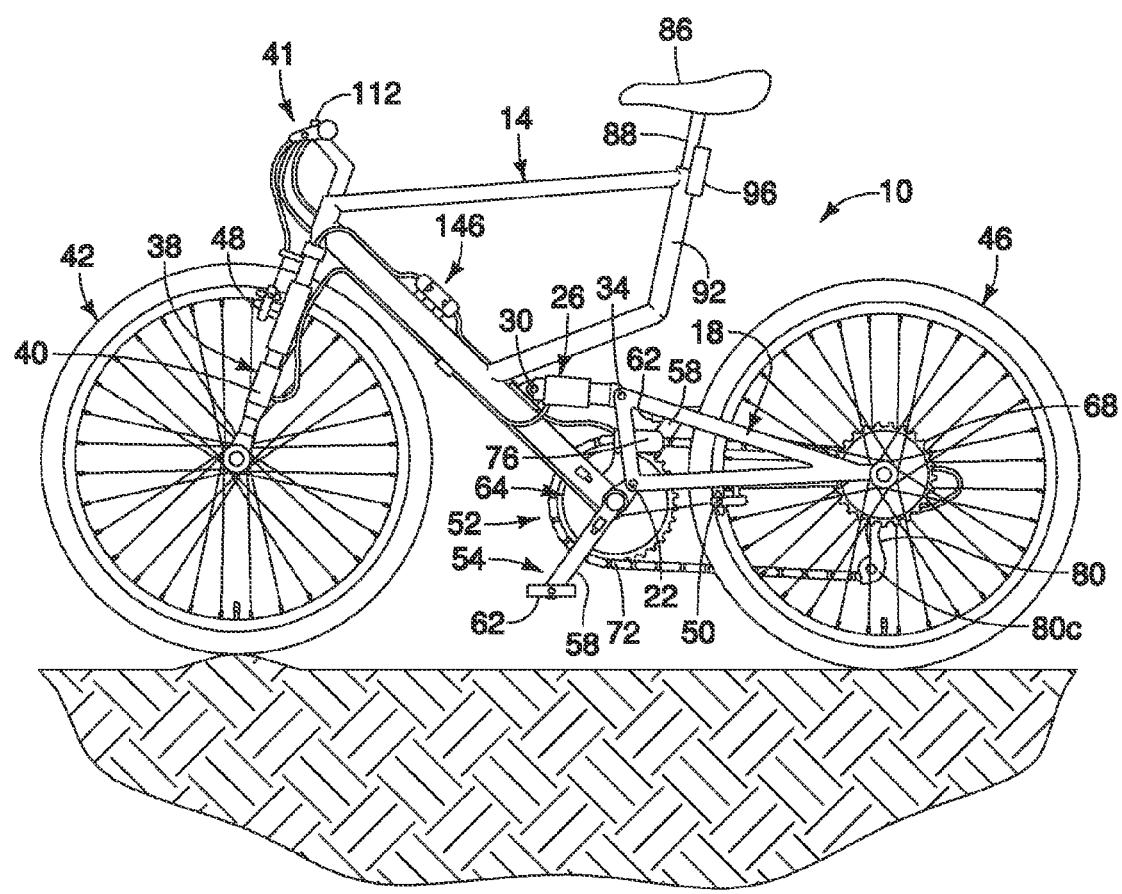
FIG. 1 is a side elevational view of a bicycle that includes particular embodiments of adjustable components.

Referring initially to FIG. 1, a bicycle 10 is illustrated that includes particular embodiments of adjustable components in accordance with one embodiment. FIG. 1 is a side elevational view of the bicycle 10. In this embodiment, the bicycle 10 is a sport bicycle in the form of a mountain bicycle. The bicycle 10 basically comprises a front frame portion 14, a rear frame portion 18 pivotally coupled to front frame portion 14 through a pivot shaft 22, a rear suspension element 26 with a front end pivotally coupled to the front frame portion 14 through a pivot shaft 30 and a rear end pivotally coupled to the rear frame portion 18 through a pivot shaft 34, a front fork 38 rotatably mounted to front frame portion 14 and including a pair of front suspension elements 40, a handlebar assembly 41 mounted to the upper part of fork 38, a front wheel 42 rotatably attached to the lower part of fork 38, a rear wheel 46 rotatably attached to the rear of rear frame portion 118, a front brake 48 for braking front wheel 42, a rear brake 50 for braking rear wheel 46, and a drive mechanism 52.

The drive mechanism 52 comprises a pedal crank 54 that includes a pair of crank arms 58 with attached pedals 62, a plurality of front sprockets 64 attached to pedal crank 54, a plurality of rear sprockets 68 attached to rear wheel 46, a chain 72, an electrically-controlled front derailleur 76 for engaging the chain 72 with selective ones of the front sprockets 64, and an electrically-controlled rear derailleur 80 for engaging the chain 72 with selective ones of the plurality of rear sprockets 68. A front derailleur position sensor 78 (FIG. 3) is operatively coupled to the front derailleur 76 to detect the position of the front derailleur 76, and hence the front sprocket 64 currently engaged by the chain 72.

The rear derailleur 80 includes a base member 80a (FIG. 3), a movable member 80b movably coupled to the base member 80a, and a chain guide 80c coupled to movable member 80b for rotation around a rotational axis. A rear derailleur position sensor 82 is operatively coupled to the rear derailleur 80 to detect the position of the rear derailleur 80 and hence the rear sprocket 68 currently engaged by the chain 72. A rotation resistance changing device 83 is operatively coupled to the rear derailleur 80 to apply resistance to rotation of the chain guide 80c relative to the movable member 80b. The base member 80a, the movable member 80b, the chain guide 80c, the rotation resistance changing device 83 and associated linkages of the rear derailleur 80 are preferably constructed according to the teachings of U.S. Patent Application Publication No. 2012/0083371 discussed above, wherein a resistance applying (friction) element and a corresponding resistance control unit are used to selectively apply resistance to rotation of the chain guide relative to the movable member disclosed therein. A driver control unit 84 is provided for electrically operating (e.g., pressing, sliding or rotating) the mechanical components (e.g., a lever, cam or push button) used to control the resistance applied to the chain guide 80c as well as to move the chain guide 80c from one sprocket to another.

A bicycle seat in the form of a saddle 86 is mounted to the front frame portion 14 through a seat post 88 that telescopically fits within a seat tube 92 of the front frame portion 14. A seat position sensor 96 is mounted to the seat tube 92 and cooperates with the seat post 88 to sense the position of the saddle 86 relative to the seat tube 92. A seat position driver 98 (FIG. 3) is mounted within the seat tube 92, and is connected to the seat post 88 to adjust the height of the saddle 86. The seat position driver 98 may be an electric motor such as a screw-drive motor, or it may be an air-operated motor, a hydraulic fluid motor, and so on. The seat position sensor 96 may comprise a variable electrical resistance such as a contact strip mounted to the seat tube 92 and an electrical brush mounted to the seat post 88, a potentiometer with a gear shaft mounted to the seat tube 92 and a toothed rack formed in or mounted to the seat post 88, an optical sensor comprising a phototransistor mounted to the seat tube and a shutter strip mounted to the seat post 88, an internally mounted pressure sensor (in the case of an air or hydraulic drive motor), or some other suitable sensor.

Figure 2:
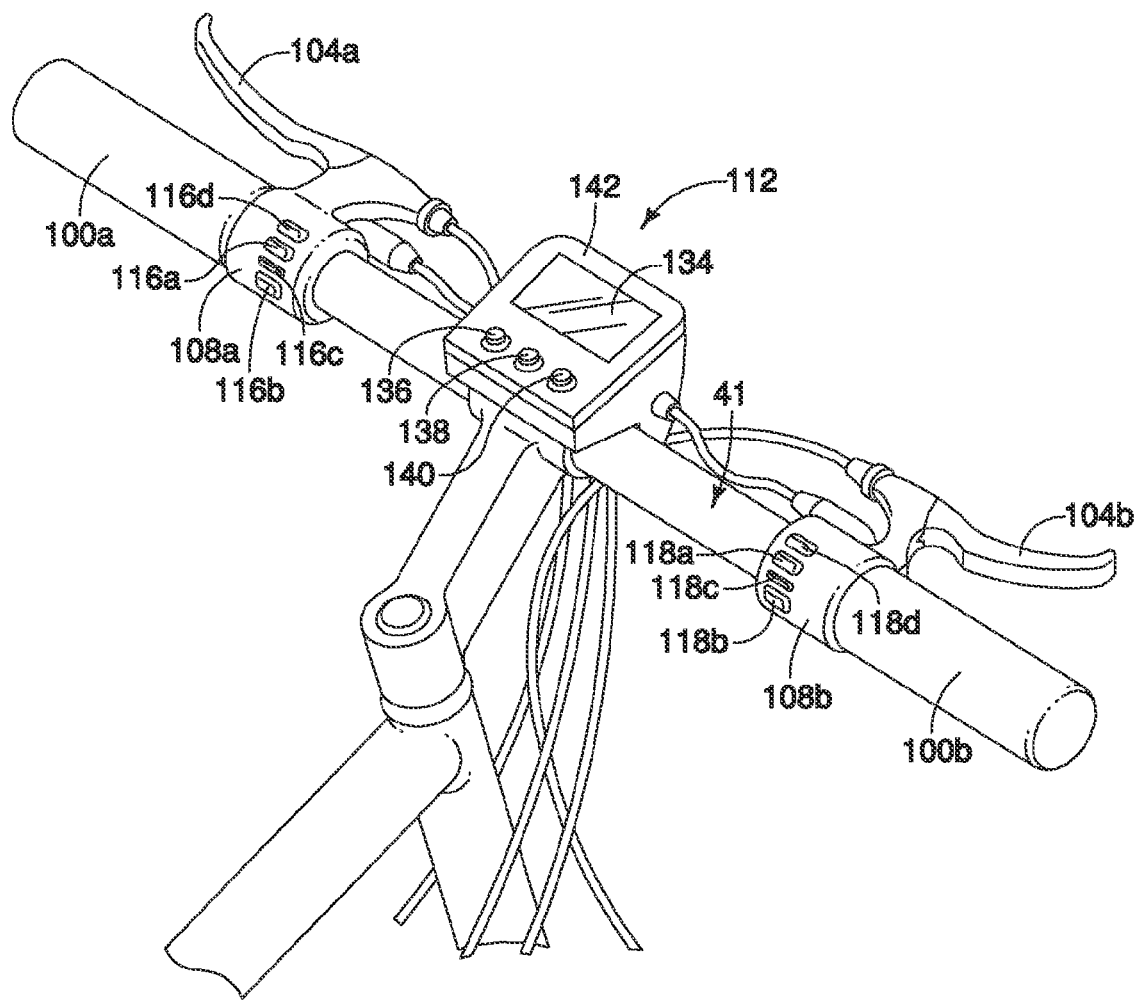
FIG. 2 is a detailed view of particular embodiments of handlebar mounted components of the bicycle illustrated in FIG. 1.

As shown in FIG. 2, a pair of grips 100a and 100b and a pair of brake levers 104a and 104b are provided on both ends of the handlebar assembly 41. The brake lever 104a is connected to the front wheel brake 48 for braking the front wheel 42, and the brake lever 104b is connected to the rear wheel brake 50 for braking the rear wheel 46. Two command units 108a and 108b are provided inwardly of the grips 100a and 100b and the brake levers 104a and 104b, respectively. Also a bicycle characteristic control unit 112 is attached to the central portion of handlebar assembly 41.

The command units 108a and 108b are used for shifting the front derailleur 76 and the rear derailleur 80, for controlling the height of saddle 86, and for controlling the operating characteristics of the rear suspension 26 and the front suspension 40. More specifically, a front upshift button 116a, a front downshift button 116b, a seat-up button 116c and a front suspension control button 116d are provided in the command unit 108a, and a rear upshift button 118a, a rear downshift button 118b, a seat-down button 118c and a rear suspension control button 118d are provided in the command unit 108b. In this embodiment, the upshift buttons 116a and 118a provide signals to the bicycle characteristic control unit 112 for upshifting front and rear derailleurs 76 and 80, respectively, by one gear ratio, and downshift buttons 116b and I 18b provide signals to the bicycle characteristic control unit 112 for downshifting front and rear derailleurs 76 and 80, respectively, by one gear ratio. The seat-up button 116c provides signals to the bicycle characteristic control unit 112 to raise the saddle 86, and the seat-down button 118c provides signals to the bicycle characteristic control unit 112 to lower the saddle 86. The front and rear suspension control buttons 116d and 118d provide signals to the bicycle characteristic control unit 112 to control a number of functions of the front and rear suspensions 40 and 26, respectively. Such functions are described in more detail below.

Figure 3:
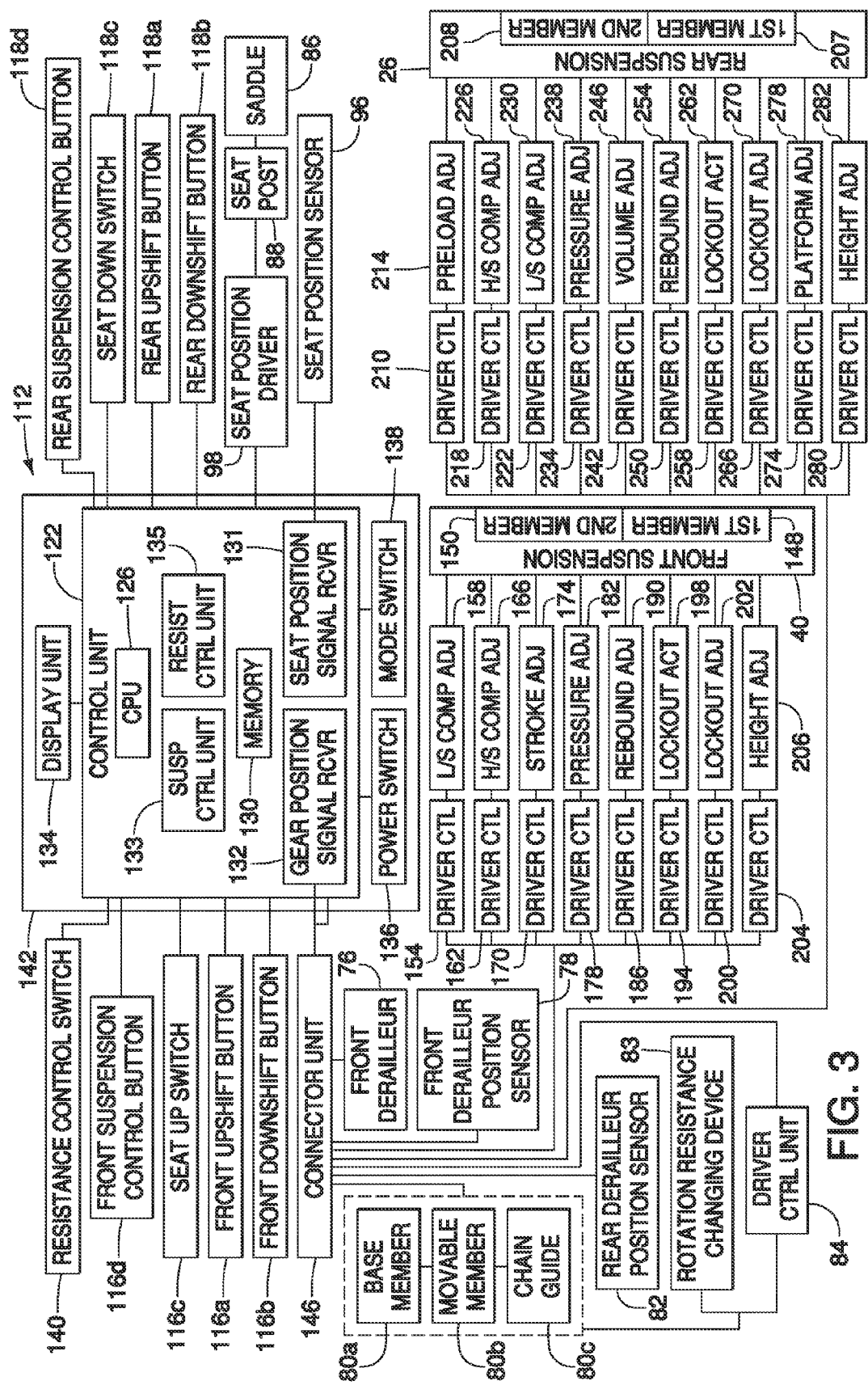
FIG. 3 is a block diagram of a particular embodiment of a control mechanism of the bicycle illustrated in FIG. 1.

As shown in FIG. 3, the bicycle characteristic control unit 112 is electrically connected through appropriate wiring to the electrical components associated with the command units 108a and 108b, to the electrical components associated with the rear suspension 26, to the electrical components associated with the front suspension 40, to the electrical components associated with the front derailleur 76, to the electrical components associated with the rear derailleur 80, and to the electrical components associated with the saddle 86. Of course, the bicycle characteristic control unit 112 may be operatively coupled to any one of those components by appropriate wireless communication devices as well.

The bicycle characteristic control unit 112 is a microcomputer or controller that basically comprises a control unit 122 having a CPU 126, a memory 130, a seat position signal receiver 131 for receiving the seat position signals from seat position sensor 96, a gear position signal receiver 132 for receiving gear position signals from the front derailleur position sensor 76 and the rear derailleur position sensor 82, a suspension control unit 133 that provides control signals to control the operating parameters of the rear suspension element 26 and the front suspension elements 40, a resistance control unit 135 that provides control signals to control the resistance applied to the chain guide 80c, a display unit 134 for displaying the current gear ratio and other information, a power switch 136, a mode switch 138, and a rear derailleur resistance control switch 140. The CPU 126 is a programmed processor that operates according to the information stored in memory 130. The seat position signal receiver 131 and the gear position signal receiver 132 may comprise appropriate input terminals and buffers to convert the input signals into proper signals for use by the control programs, they may comprise wireless receivers, optical receivers, and so on. The power switch 136 turns the bicycle characteristic control unit 112 on and off. The mode switch 138 changes an operating mode of the bicycle characteristic control unit 112 and may be used in conjunction with the front suspension control button 116d and the rear suspension control button 118d to select and control the desired functions of the rear suspension element 26 and the front suspension elements 40. The resistance control switch 140 is used to control user-controllable operating parameters of rotation resistance changing device 83.

As shown in FIG. 2, the bicycle characteristic control unit 112 includes a box-like housing 142. The display unit 134, the power switch 136, the mode switch 138 and the resistance control switch 140 are arranged on the upper surface of housing 142. As shown in FIGS. 1 and 3, the bicycle characteristic control unit 112 is connected to the electrical components associated with the front derailleur 76, to the electrical components associated with the rear derailleur 80, to the electrical components associated with the rear suspension element 26 and to the electrical components associated with the front suspension elements 40 by a connector unit 146.

In this embodiment, the front suspension elements 40 comprise a pair of air-operated shock absorbers. As shown schematically in FIG. 3, each shock absorber comprises a first member (e.g., a piston) 148 that moves relative to a second member (e.g., a cylinder chamber) 150. External adjustment elements are provided for low speed and high speed compression damping (e.g., the driver control units 154, 162 and a separate lever-operated adjustment knob 158 and 166 for each setting), for stroke (piston travel or compression chamber volume) (e.g., a driver control unit 170 and a lever-operated adjustment knob 174), for air chamber pressure (e.g., a driver control unit 178 and an air valve 182), for rebound damping (e.g., a driver control unit 186 and a lever-operated adjustment knob 190), for lockout actuation (e.g., a driver control unit 194 and a lever-operated actuation knob 198), for lockout force adjustment (e.g., a driver control unit 200 and a lever-operated adjustment knob 202) and for height adjustment (e.g., a driver control unit 204 and a (ever-operated adjustment knob or valve 206).

In this embodiment, the rear suspension element 26 comprises a combination air- and oil-operated shock absorber comprising a first member (e.g., a piston) 207 that moves relative to a second member (e.g., a cylinder chamber) 208 with a typical external spring (not shown in the drawings). External adjustment elements are provided for spring preload (e.g., a driver control unit 210 and a lever-operated adjustment nut 214), for low speed and high speed compression damping (e.g., driver control units 218 and 222 and a separate lever-operated knob 226 and 230 for each setting), for air chamber pressure adjustment (e.g., a driver control unit 234 and an air pressure adjusting valve 238), for air chamber volume adjustment (e.g., a driver control unit 242 and a lever-operated adjustment screw 246), for rebound damping (e.g., a driver control unit 250 and a lever-operated adjustment knob 254), for lockout actuation (e.g., a driver control unit 258 and a lever-operated actuating knob 262), for lockout force adjustment (e.g., a driver control unit 266 and a lever-operated adjustment knob 270), for platform (anti-bobbing) adjustment (e.g., a driver control unit 274 and a lever-operated actuating valve 278), and for height adjustment (e.g., a driver control unit 280 and a lever-operated adjustment knob or valve 282). Air chamber pressure and volume adjustments may be used to adjust the pressure and volume of the main air chamber or for platform (pedaling) damping. Examples of such parameter adjustments may be found in current shock absorbers sold by Fox and Manitou, for example.

Driver control units for adjustment elements that make adjustments in a continuous manner (e.g., compression damping of the rear suspension element 26 and the front suspension elements 40, the rotation resistance in rear derailleur 80) may comprise continuous-movement motors or some other suitable motor together with position sensors (potentiometers, resistive position sensors, optical position sensors, contact switches, etc.) that indicate the operating position of the associated knob, lever or other adjusting element. If desired, each driver control unit may include its own microprocessor to control the operation of its associated motor in response to signals provided by the suspension control unit 133 and the resistance control unit 135 and to provide status signals to the control unit 122. Similarly, driver control units for adjustment elements that make adjustments in discrete increments (e.g., three-step stroke adjustment of the rear suspension elements 26 and the front suspension elements 40, multistep resistance adjustment (low, medium, high, etc.) for the rear derailleur 80) may comprise stepper motors or some other suitable motor together with position sensors that indicate the operating position of the associated knob, lever or other adjusting element and with any desired additional microprocessors. Driver control units for adjustment elements that operate in an on/off manner (e.g., lockout actuation of the rear suspension element 26 and the front suspension elements 40, ON/OFF resistance for the rear derailleur 80) may comprise a solenoid or some other suitable driver together with position sensors that indicate the operating position of the associated knob, lever or other adjusting element and with any desired additional microprocessors.

In this embodiment, the electrical components associated with rear suspension 26, the electrical components associated with front suspension 40, the electrical components associated with the rear derailleur 80, and the electrical components associated with saddle 86 are operatively coupled so that changes to one component result in changes to the status or operation characteristic (e.g., position, movement, pressure or volume relation of a first member relative to a second member) of at least one other component. The following tables provide examples of the conjoined operation of various components when rotation resistance changing device 83 for the rear derailleur 80 has basic ON/OFF operation.

TABLE 1

| Rear Derailleur Resistance | Front Suspension Lockout |
|---|---|
| OFF | ON |
| ON | OFF |

TABLE 2

| Rear Derailleur Resistance | Front Suspension Height |
|---|---|
| OFF | LOW |
| ON | HIGH |

TABLE 3

| Rear Derailleur Resistance | Rear Suspension Lockout |
|---|---|
| OFF | ON |
| ON | OFF |

TABLE 4

| Rear Derailleur Resistance | Rear Suspension Platform Damping |
|---|---|
| OFF | ON |
| ON | OFF |

TABLE 5

| Rear Derailleur Resistance | Seat Height |
|---|---|
| OFF | HIGH |
| ON | LOW |

The following tables provide examples of the conjoined operation of various components when the rotation resistance changing device 83 for the rear derailleur 80 has a multistep operation.

TABLE 6

| Rear Derailleur Resistance | Front Suspension Height |
|---|---|
| OFF | LOW |
| ON - Low Resistance | MIDDLE |
| ON - High Resistance | HIGH |

TABLE 7

| Rear Derailleur Resistance | Seat Height |
|---|---|
| OFF | HIGH |
| ON - Low Resistance | MIDDLE |
| ON - High Resistance | LOW |

Of course, the operation of any number of components may be conjoined as shown by the following table.

TABLE 8

| Rear Derailleur Resistance | Front Suspension Height | Rear Suspension Platform Damping | Seat Height |
|---|---|---|---|
| OFF | LOW | ON | HIGH |
| ON | HIGH | OFF | MIDDLE |

In the preferred embodiment, the rear derailleur resistance functions as the reference variable. In other words, after the user sets the desired rear derailleur resistance, the algorithm checks the state of rotation resistance changing device 83 for rear derailleur 80 and then adjusts the other components accordingly at approximately the same time. For example, in the embodiment shown in Table 8, the algorithm first determines whether rear derailleur resistance is set to OFF. If so, then the height of the front suspension 40 is set to LOW, platform damping of the rear suspension 26 is set to ON, and the height of the saddle 86 is set to HIGH. Of course, the status or operation characteristic of any component could be used as the reference variable depending upon the application, and the status or operation characteristic of more than one component could be used as a combination reference variable through an appropriate Boolean operation.

Figure 4:
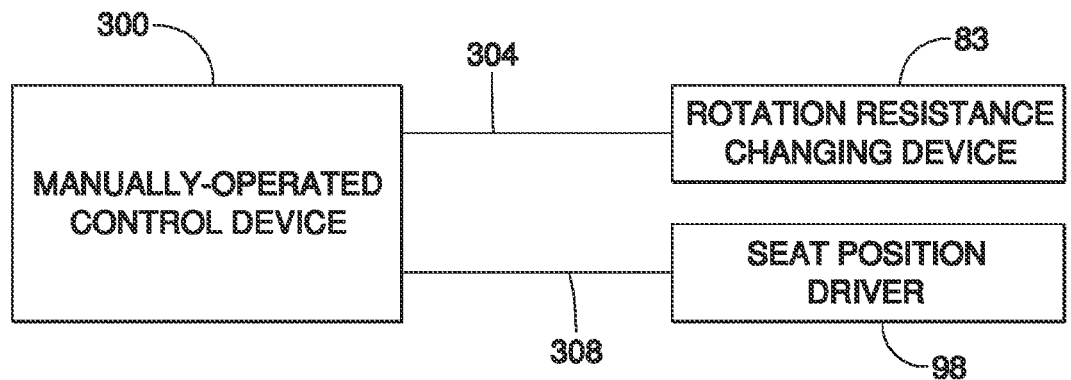
FIG. 4 is a schematic diagram of a manually-operated control device operatively coupled to two other bicycle components of the bicycle illustrated in FIG. 1.

While the above is a description of various embodiments of inventive features, further modifications may be employed without departing from the spirit and scope of the present invention. For example, in the described embodiment the resistance applied to rotation of the chain guide 80c of the rear derailleur 80, the height of saddle 86 and the operating characteristics of rear suspension 26 and front suspension elements 40 were electrically controlled, but the teaching herein could be applied to the manual operation of one or more components. For example, as schematically shown in FIG. 4, a single manually-operated control device 300 such as a control lever could be coupled to a manually-operated control component in the rotation resistance changing device 83 and to a manually-operated control component in the seat position driver 98 through two parallel-connected Bowden cables 304 and 308, wherein one end of each Bowden cable 304 and 308 is operatively coupled to the manually-operated control device 300, the other end of Bowden cable 304 is operatively coupled to the manually-operated control component in the rotation resistance changing device 83, and the other end of Bowden cable 308 is operatively coupled to the manually-operated control component in seat position driver 98.

Figure 5:
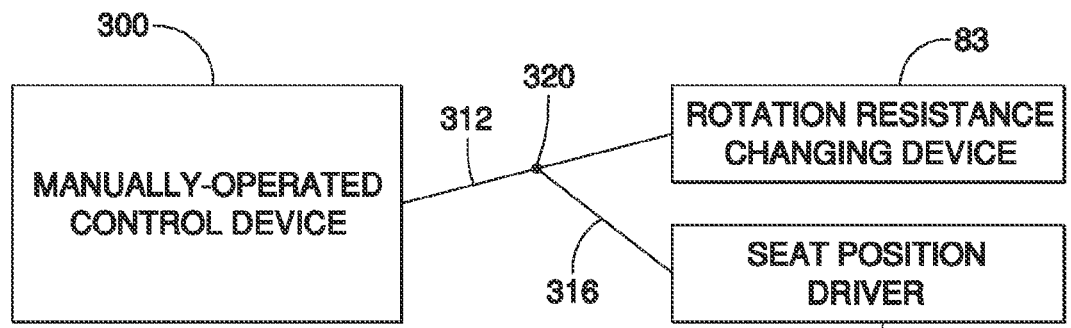
FIG. 5 is a schematic diagram of another embodiment of a manually-operated control device operatively coupled to two other bicycle components of the bicycle illustrated in FIG. 1.

Alternatively, as schematically shown in FIG. 5, the manually-operated control device 300 could be operatively coupled to the manually-operated control component in the rotation resistance changing device 83 through a first Bowden cable 312, and the manually-operated control component in the seat position driver 98 could be operatively coupled to the manually-operated control device 300 through a second Bowden cable 316 that is spliced to an intermediate location 320 of first Bowden cable 312.

Figure 6:
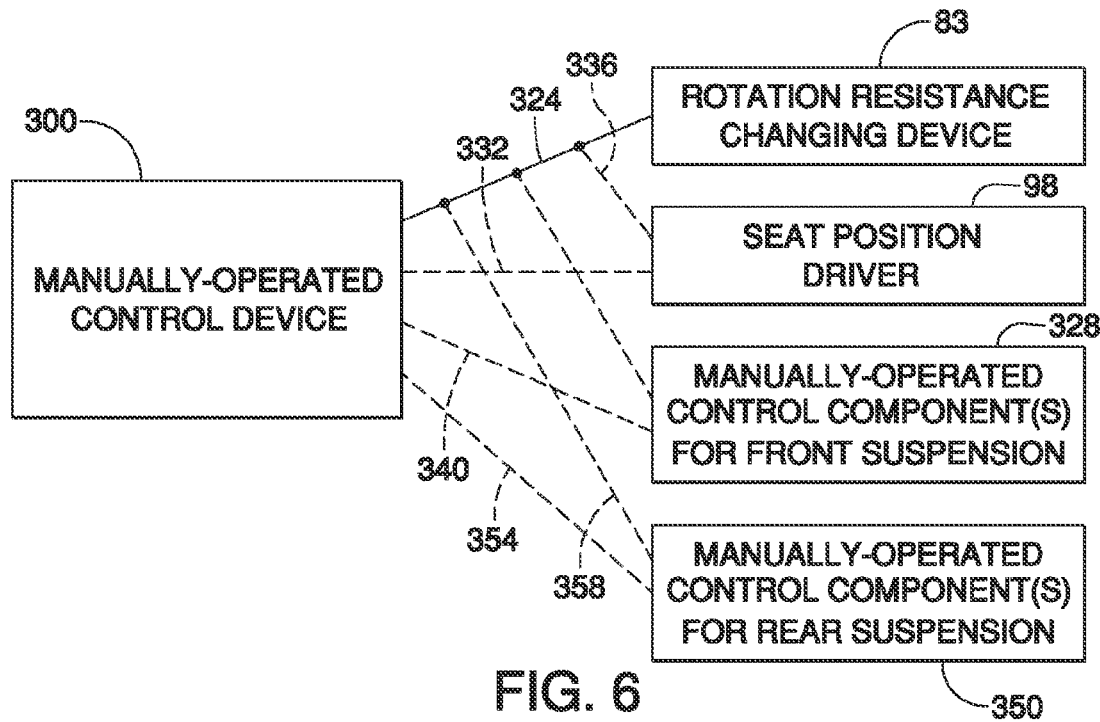
FIG. 6 is a schematic diagram of a manually-operated control device operatively coupled to two or more other bicycle components of the bicycle illustrated in FIG. 1.

As schematically shown in FIG. 6, the manually-operated control device 300 could be operatively coupled to the manually-operated control component in the rotation resistance changing device 83 through a first Bowden cable 324 and optionally operatively coupled in parallel to the manually-operated control component in the seat position driver 98 through a Bowden cable 332 or through a spliced-in Bowden cable 336, to one or more manually-operated control component(s) 328 in the front suspension elements 40 through a Bowden cable 340 or through a spliced-in Bowden cable 344 and/or to one or more manually-operated control component (s) 350 in rear suspension element 26 through a Bowden cable 354 or through a spliced-in Bowden cable 358. Of course, the components could be operatively coupled in series as well.

While air-operated shock absorbers and oil-operated shock absorbers were disclosed, any pressure-operated or spring-operated shock absorber could be used, such as a hydraulically-operated shock absorber. Any operation characteristic (e.g., pressure; volume; position; movement such as ON/OFF, velocity or acceleration; resistance to movement, etc.) of a first member relative to a second member of any number of components may be controlled based upon a similar operation characteristic of one or more reference components.

As used herein, the word "lockout" of a shock absorber does not necessarily mean that the first shock absorbing member (e.g., outer tubular suspension member) is completely immovable relative to the second shock absorbing member (e.g., telescoping inner tubular suspension member). Lockout refers to turning the normal shock absorbing function off. In the lockout state, the first shock absorbing member may have some movement relative to the second shock absorbing member because of manufacturing and/or hydraulic tolerances. Also, some shock absorbers may have a shock threshold beyond which the first shock absorbing member will be allowed to move significantly relative to the second shock absorbing member, or even turn on the normal shock absorbing function, in order to avoid damage to the shock absorber during severe riding conditions.

In the disclosed embodiments, bicycle components such as the front suspension elements 40, the rear derailleur 80, etc. functioned as slave devices that were operated by master control devices such as the command units 108a and 108b. In other words, the bicycle components controlled by the command units 108a and 108b did not function as master control devices that directly operated other bicycle components. However, in some embodiments a bicycle component that functions as a slave component also may function as a master control device for some other bicycle component.

Figure 7:
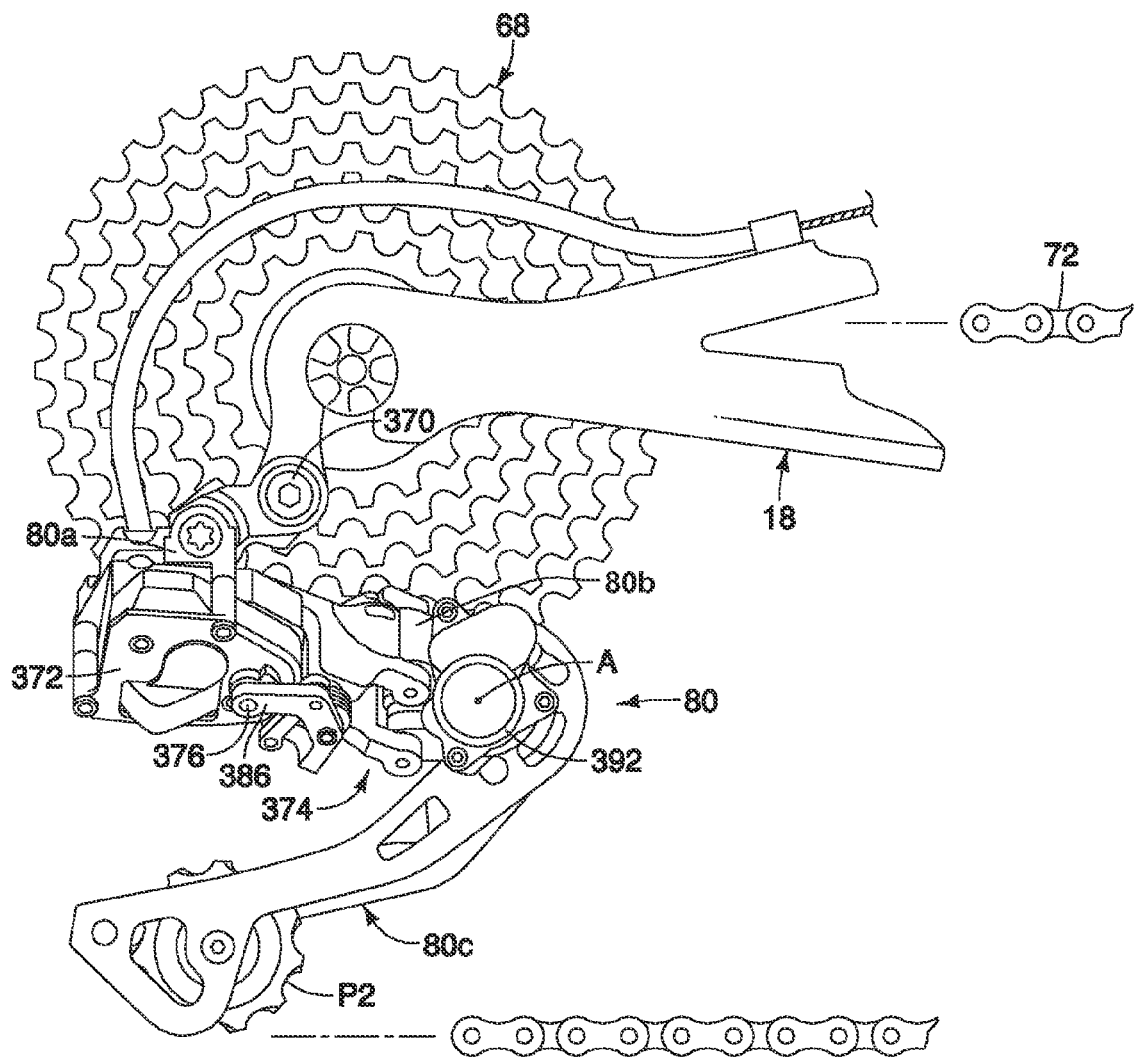
FIG. 7 is a partial side elevational view of the rear portion of the bicycle illustrated in FIG. 1 with the rear derailleur in a first (low) operating position.
Figure 8:
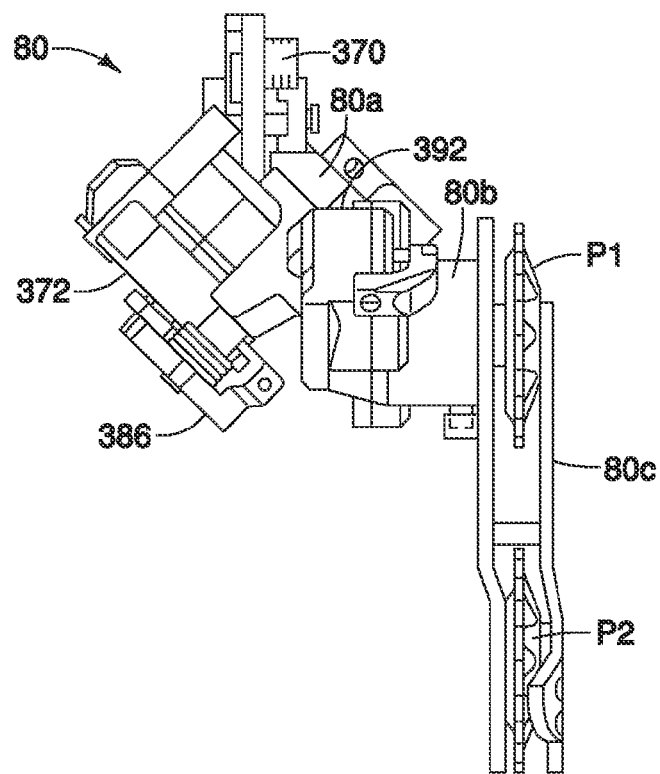
FIG. 8 is a front elevational view of the rear derailleur illustrated in FIG. 7.
Figure 9:
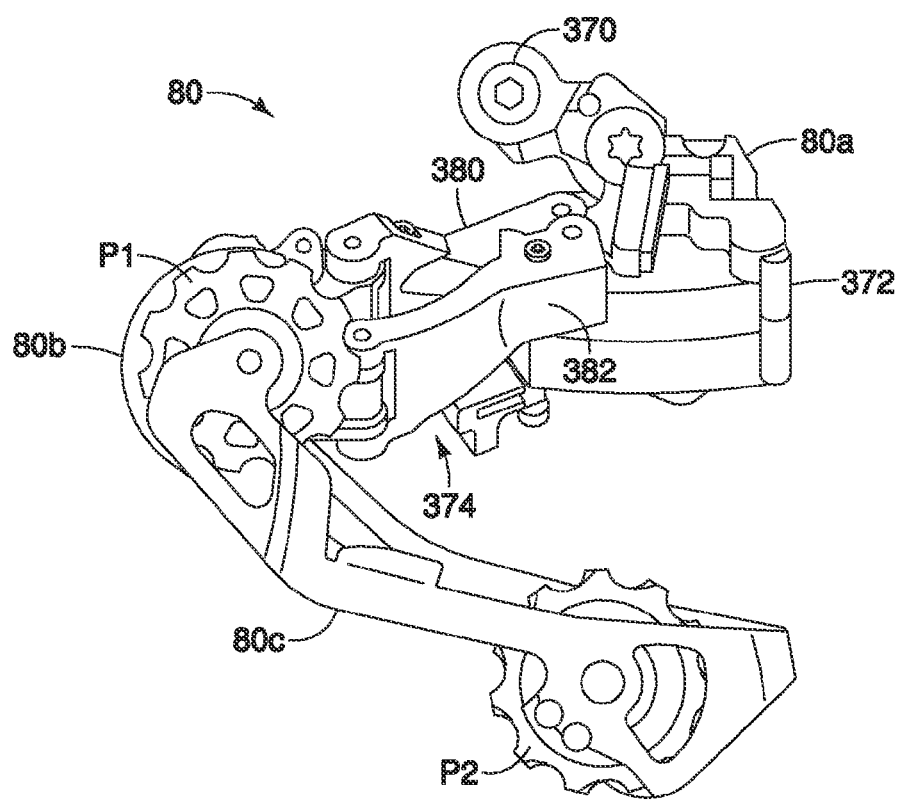
FIG. 9 is a frame side elevational view of the rear derailleur illustrated in FIGS. 7 and 8.
Figure 10:
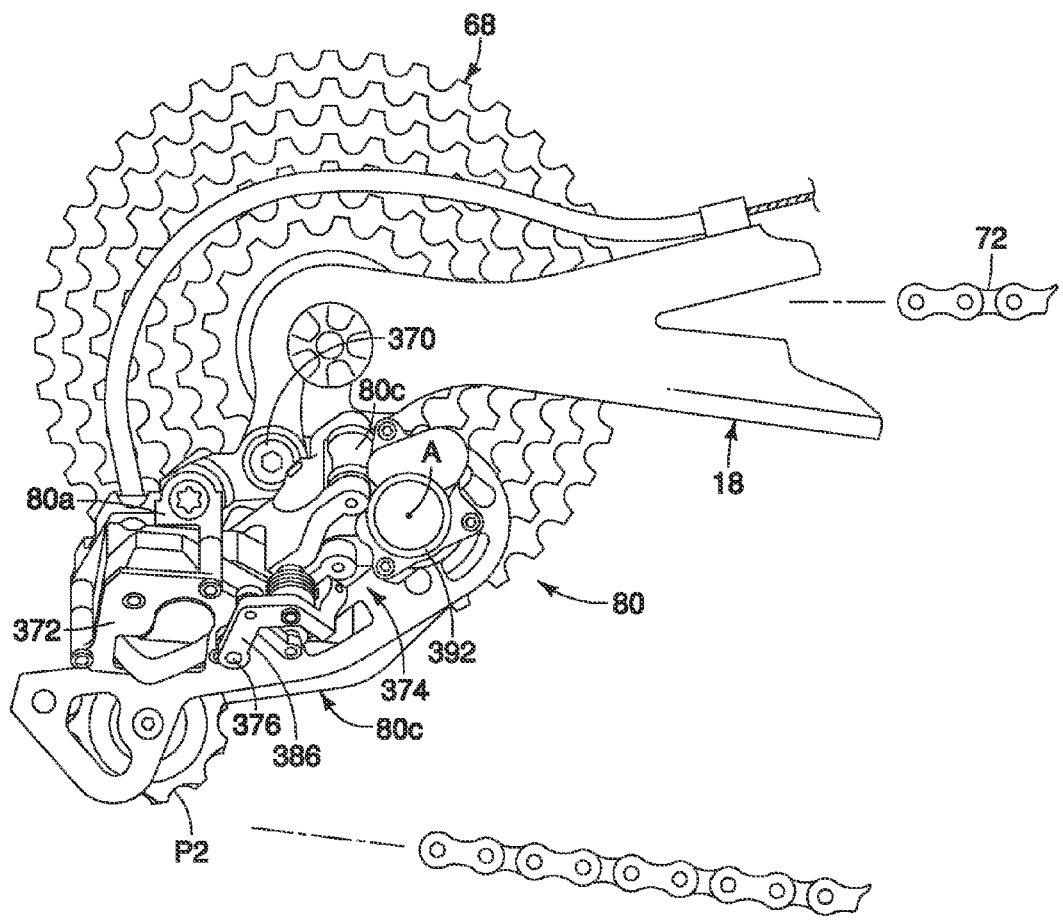
FIG. 10 is a partial side elevational view of the rear portion of the bicycle illustrated in FIG. 1 with the rear derailleur in a second (top) operating position.
Figure 11:
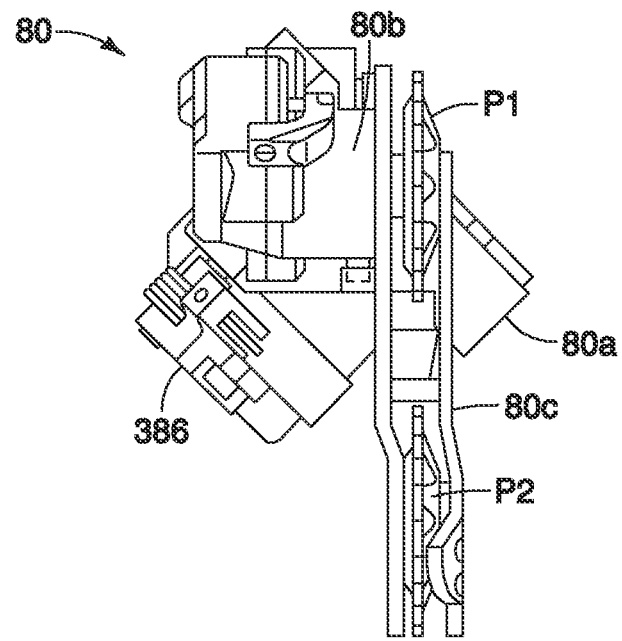
FIG. 11 is a front elevational view of the rear derailleur illustrated in FIG. 10.
Figure 12:
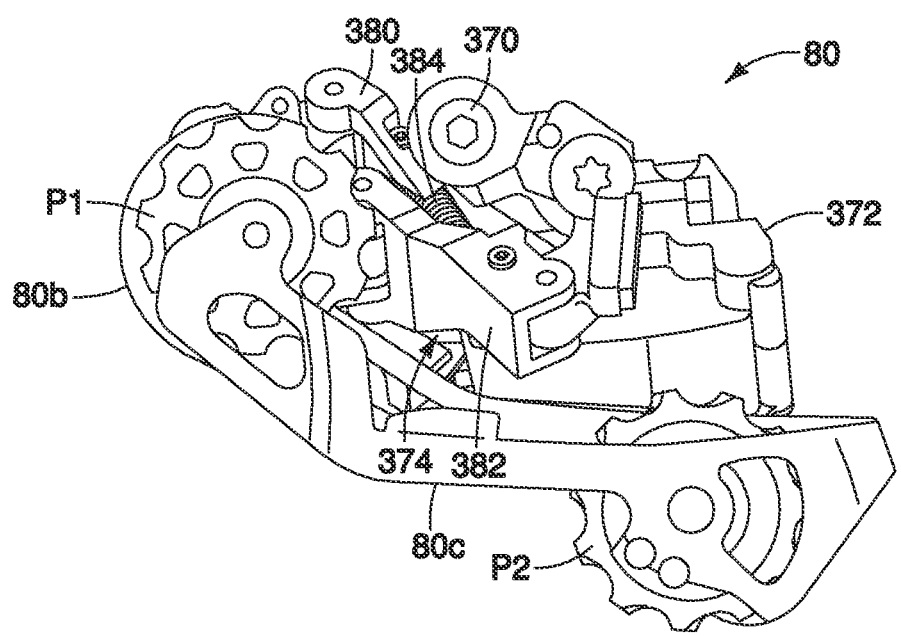
FIG. 12 is a frame side elevational view of the rear derailleur illustrated in FIGS. 10 and 11.
Figure 13:
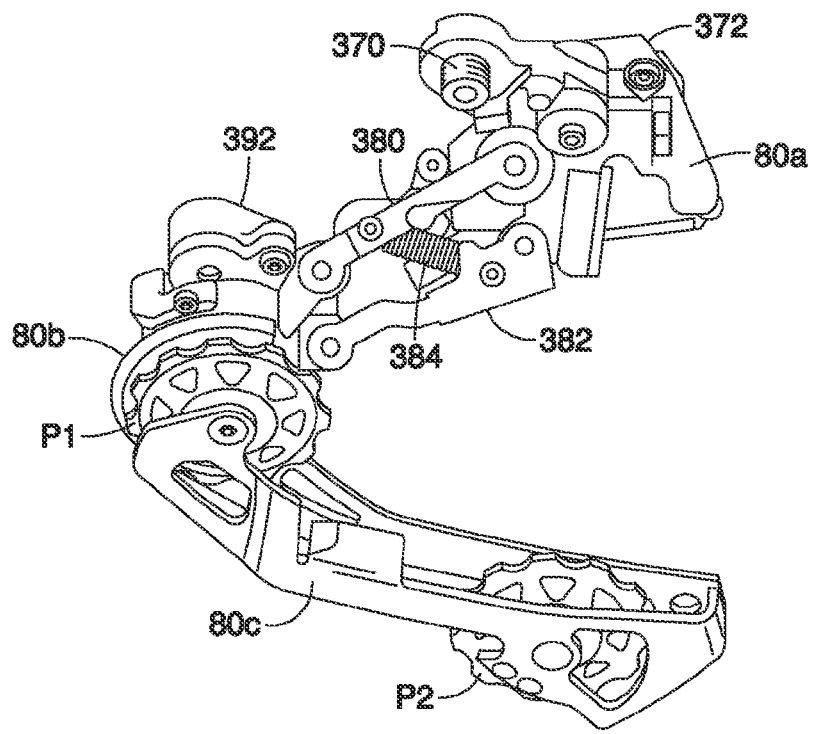
FIG. 13 is a frame side perspective view of the rear derailleur illustrated in FIGS. 7 to 12.
Figure 14:
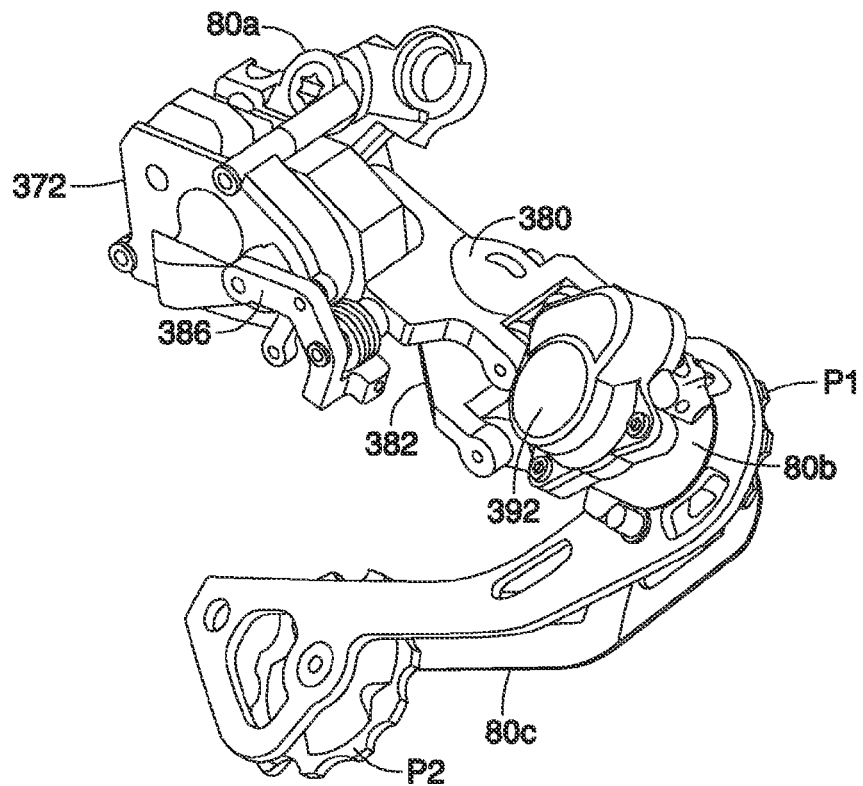
FIG. 14 is a non-frame side perspective view of the rear derailleur illustrated in FIGS. 7 to 13.
Figure 15:
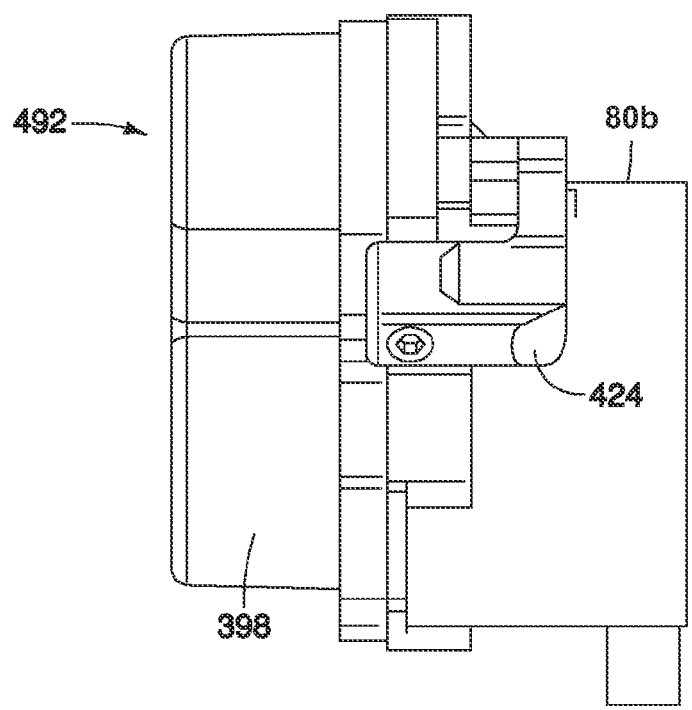
FIG. 15 is a front elevational view of the movable member of the rear derailleur illustrated in FIGS. 7 to 14, with the friction element attached to the movable member.
Figure 16:
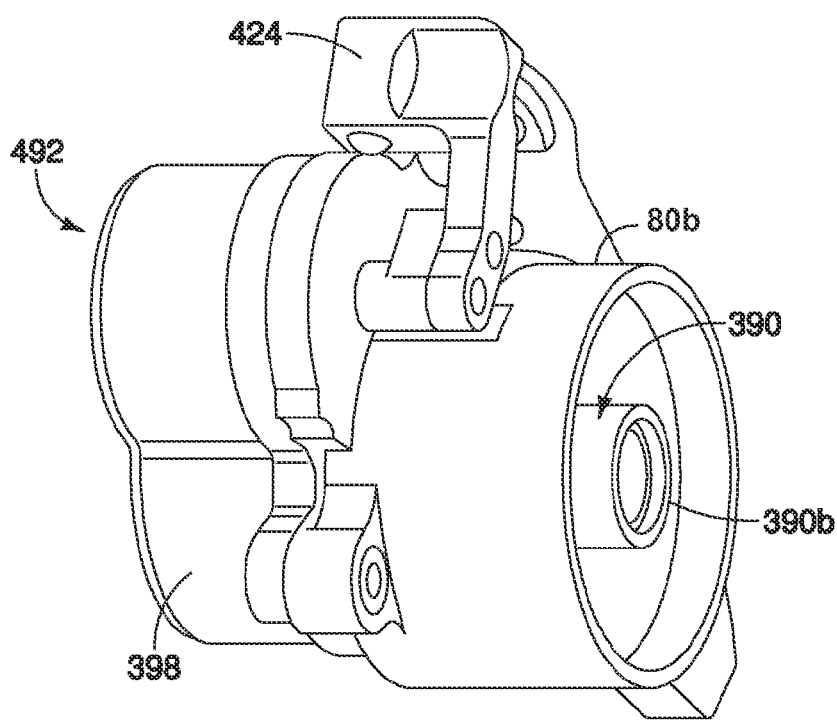
FIG. 16 is a front perspective view of the movable member of the rear derailleur illustrated in FIGS. 7 to 14, with the friction element attached to the movable member.
Figure 17:
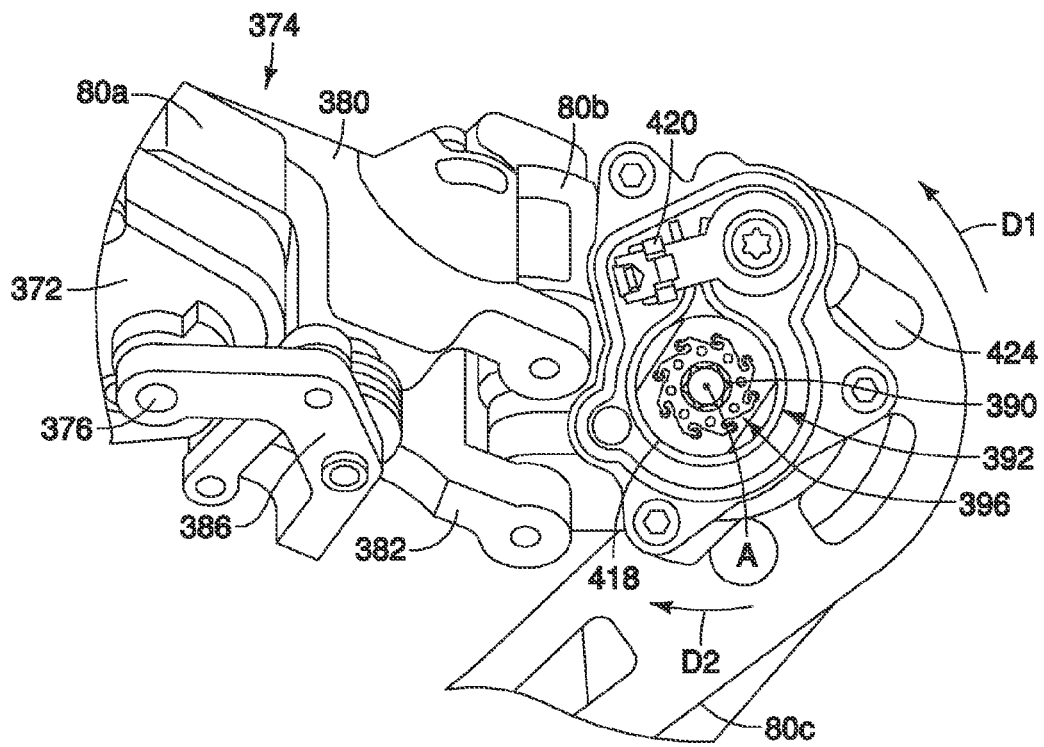
FIG. 17 is a partial non-frame side elevational view of a portion of the rear derailleur illustrated in FIGS. 7 to 14, with a cover of the friction element removed.
Figure 18:
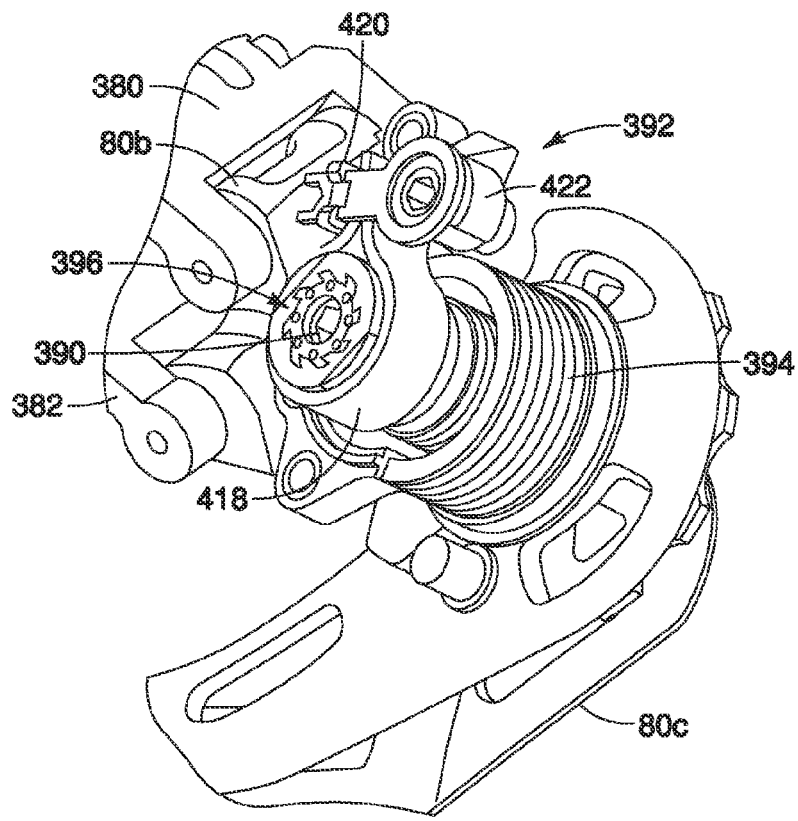
FIG. 18 is a partial non-frame side perspective view of the portion of the rear derailleur illustrated in FIGS. 7 to 14, with a cover of the friction element removed and part of the movable member broke away.
Figure 19:
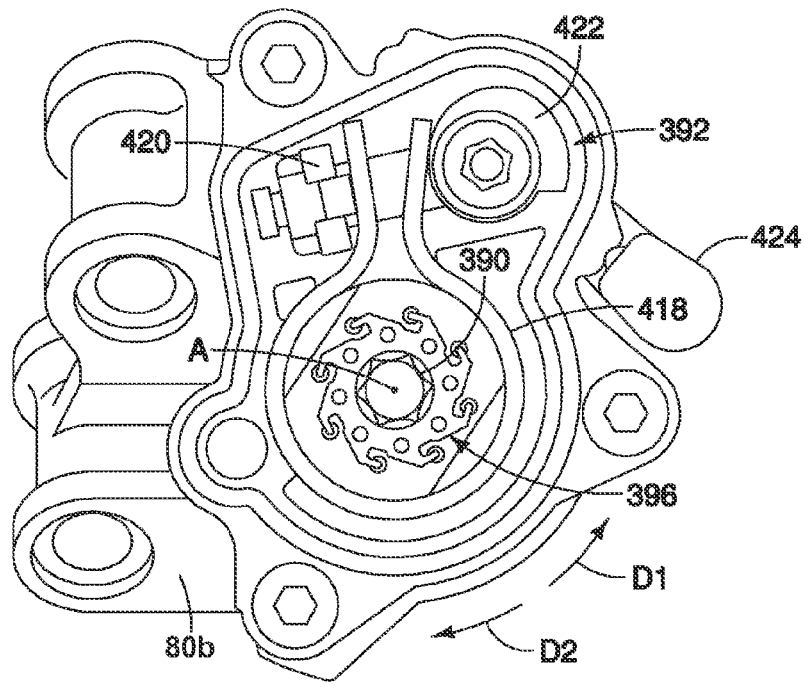
FIG. 19 is a non-frame side elevational view of the movable member of the rear derailleur illustrated in FIGS. 7 to 14, with the friction element attached to the movable member and with the friction element in a first friction applying position.
Figure 20:
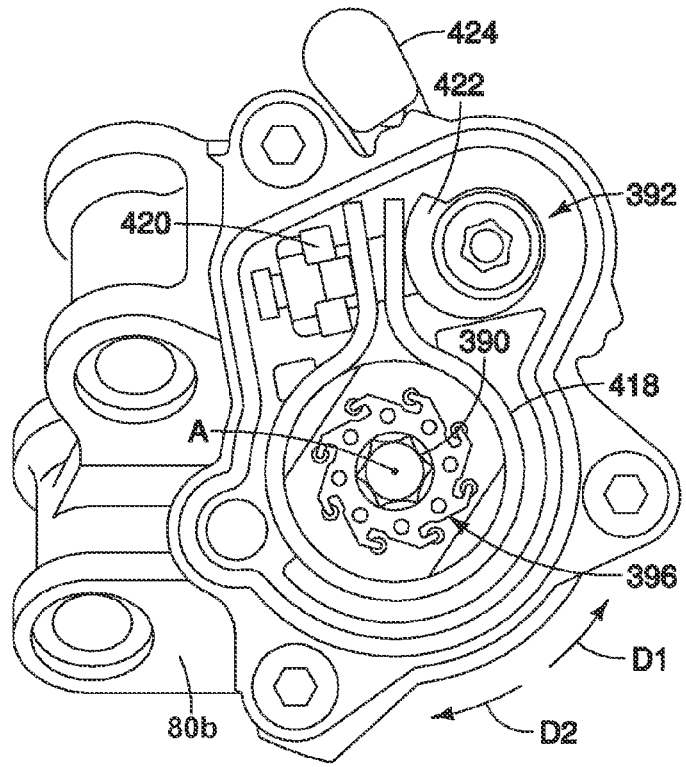
FIG. 20 is a non-frame side elevational view of the movable member of the rear derailleur illustrated in FIGS. 7 to 14, with the friction element attached to the movable member and with the friction element in a second friction applying position.

Turning now to FIGS. 7 to 23, one preferred configuration of the rear derailleur 80 will be now discussed in more detail. The base member 80a is configured to be mounted to the rear frame portion 18 of the bicycle 10 using a fixing bolt 370. Here, the rear derailleur 80 is provided with a motor 372 for moving the movable member 80b relative to the base member 80a. The motor 372 is mounted to the base member 80a, The rear derailleur 80 further includes a linkage 374 for movably coupling the movable member 80b to the base member 80a. In other words, the movable member 80b is movably coupled to the base member 80a via the linkage 374. The motor 372 has an output shaft 376 that is coupled to the linkage 374 to move the movable member 80b relative to the base member 80a between a low gear position (FIGS. 7 to 9) and a top gear position (FIGS. 10 to 12).

The linkage 374 preferably includes a first link 380 and a second link 382. The first and second links 380 and 382 have first ends pivotally connected to the base member 80a and second ends pivotally connected to the movable member 80b to define a four bar linkage arrangement. As best seen in FIG.

13, a first biasing element 384 biasing the movable member 80b and the chain guide 80c toward a low gear position with respect to the base member 80a. In the illustrated embodiment, the first biasing element 384 is a compression spring with a first end hooked onto the first link 380 and a second end hooked onto the second link 382. The output shaft 376 of the motor 372 is connected the first link 380 by a control link 386. The motor 372 is a reversible electric motor such that rotation of the output shaft 376 in one direction moves the movable member 80b and the chain guide 80c toward a low gear position with respect to the base member 80a, and that rotation of the output shaft 376 in the other direction moves the movable member 80b and the chain guide 80c toward a top gear position with respect to the base member 80a.

Figure 21:
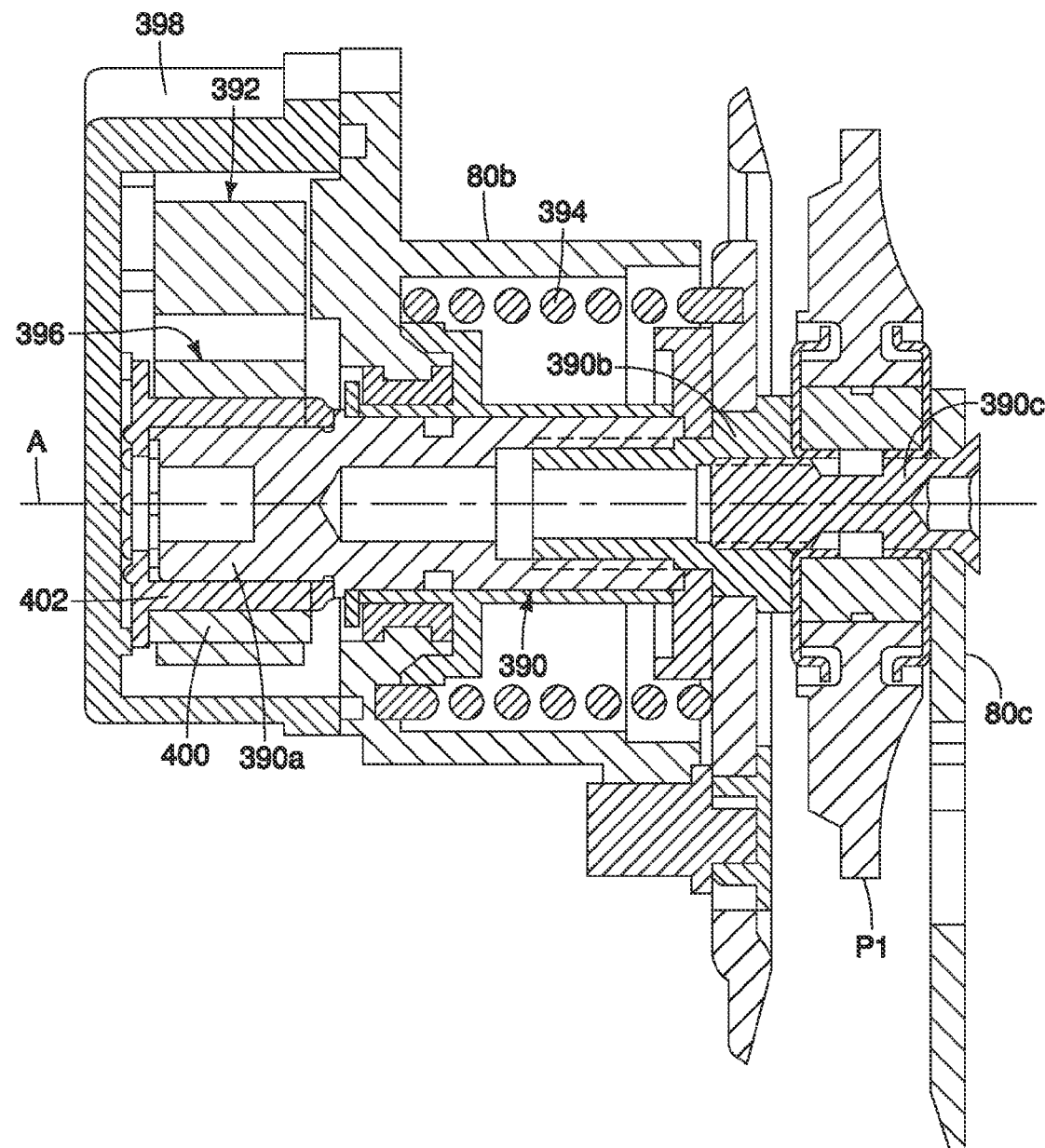
FIG. 21 is a cross sectional view of the movable member and the friction element of the rear derailleur illustrated in FIGS. 7 to 14.

The chain guide 80c is relatively conventional and includes a pair of pulleys P1 and P2. The chain guide 80c is rotatably coupled to the movable member 80b to rotate around a rotational axis A with respect to the movable member 80b. In particular, as seen in FIG. 21, a rotational shaft 390 is fixed to the chain guide 80c and rotatably coupled to the movable member 80b. The longitudinal center axis of the rotational shaft 390 defines the rotational axis A in which the chain guide 80c rotates relative to the movable member 80b. In this illustrated embodiment, the rotational shaft 390 is made of three sections 390a, 390b and 390c that are removably connected together as seen in FIG. 21.

The rear derailleur 80 further includes a friction element 392 that is operatively arranged between the movable member 80b and the chain guide 80c to frictionally provide rotational resistance in a first rotational direction D1 of the chain guide 80c. The first rotational direction D1 is a counterclockwise rotational direction of the chain guide 80c around the rotational axis A while being viewed along the rotational axis A from a non-frame facing side of the movable member 80b. The motor 372 is operatively coupled to the movable member 80b via the linkage 374 to move the movable member 80b with respect to the base member 80a, which results in the chain guide 80c rotating around the rotational axis A with respect to the movable member 80b.

A second biasing element 394 is provided between the movable member 80b and the chain guide 80c to bias the chain guide 80c around the rotational axis A in a second rotational direction D2 which is opposite to the first rotational direction D1. Thus, the second rotational direction D2 is a clockwise rotational direction of the chain guide 80c around the rotational axis A while being viewed along the rotational axis A from the non-frame facing side of the movable member 80b. In this illustrated embodiment, the second biasing element 394 is a torsion spring having a first end disposed in an opening in the movable member 80b and a second end disposed in an opening in the chain guide 80c as seen in FIG. 21.

As seen in FIGS. 17 to 23, the friction element 392 is disposed on the movable member 80b around the rotational shaft 390. Basically, the friction element 392 increases an operation energy of the motor 372 as the motor 372 moves the movable member 80b toward the low gear position with respect to the base member 80a. The operation energy of the motor 372 is substantially equal for moving the movable member 80b toward the low gear position and the top gear position.

As shown in FIGS. 17 to 23, the friction element 392 constitutes a resistance applying element. In this illustrated embodiment, a one-way clutch 396 is disposed between the friction element 392 and the rotational shaft 390. The friction element 392 applies resistance to the rotational movement of the chain guide 80c in the first rotational direction D1 with respect to the movable member 80b. In particular, the friction element 392 applies frictional resistance to rotational movement of the chain guide 80c by applying frictional resistance to the rotation of one-way clutch 396. A protective cover 398 is mounted to the movable member 80b to protect and enclosed the one-way clutch 396 and the friction element 392 from the outside environment.

Figure 22:
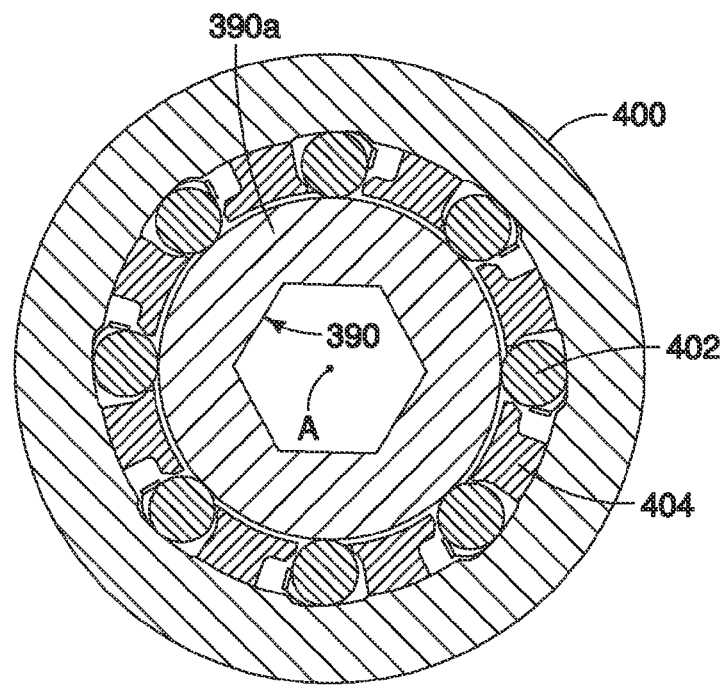
FIG. 22 is a transverse cross sectional view of the roller clutch of the rear derailleur illustrated in FIGS. 7 to 14.

As seen in FIG. 22, the rotational shaft 390 forms an inner race of the one-way clutch 396 in this embodiment. In particular, the one-way clutch 396 comprises an inner race 390a (part of the rotational shaft 390), an outer race 400, a plurality of rollers 402 and a roller retainer 404. Thus, in this embodiment, one-way clutch 396 is a roller clutch. The friction element 392 applies friction to an outer peripheral surface of the outer race 400 of the one-way clutch 396.

Figure 23:
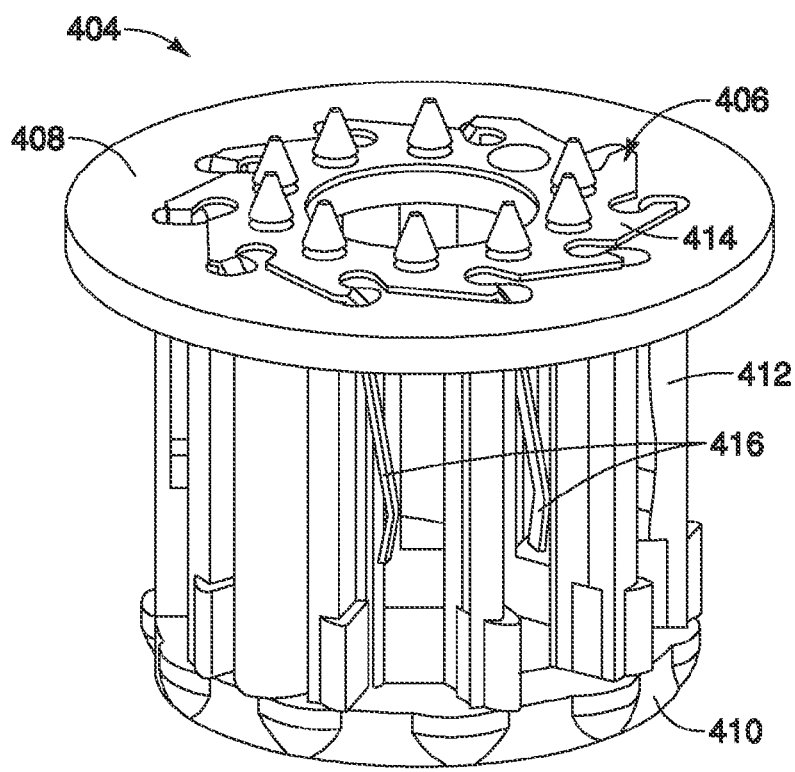
FIG. 23 is a perspective view of a roller retainer for the roller clutch of the rear derailleur illustrated in FIGS. 7 to 14.

As seen in FIG. 23, the roller retainer 404 includes a spring assembly 406 an upper retainer ring 408, a lower retainer ring 410 and a plurality of retainer columns 412. In FIG. 23, the roller retainer 404 is shown in an assembled state immediately prior to the final fastening of the spring assembly 406 to the upper retainer ring 408. In this embodiment, the spring assembly 406 includes a thin disc-shaped top plate 414 and a plurality of circumferentially disposed leaf springs 416. The top plate 410 fits within a shape-conforming recessed surface formed at the top of the upper retainer ring 408. The top plate 410 includes a central opening that aligns with a central opening formed in upper retainer ring 408 for receiving the rotational shaft 390. Since the one-way clutch 396 is discussed in detail in U.S. Patent Application Publication No. 2012/0083371, the one-way clutch 396 will not be discussed in further detail herein.

With this arrangement, the operation energy of the motor 372 is substantially equal for moving the movable member toward the low gear position and the top gear position. In other words, the friction element 392 increases an operation energy of the motor 372 as the motor 372 moves the movable member 80b toward the low gear position with respect to the base member 80b. The friction element 392 frictionally provides a rotational resistance in the first rotational direction D1 of the chain guide 80c. So the operation energy of an inward shift of the chain guide 80c towards the low gear position is larger than the operation energy of the outward shift of the chain guide 80c towards the top gear position. However, since the chain guide 80c is biased to the low gear position by the first biasing element 384, the operation energy of the motor 372 for an inward shift and an outward shift can be balance to be identical (i.e., the same within normal manufacturing tolerances). Therefore a reduction ratio of a gear unit of the motor 372 becomes small and the derailleur can be more compact.

Referring to FIGS. 15 to 20, in this illustrated embodiment, the friction element 392 is adjustable to control the amount of resistance applied to the rotational shaft 390 and the chain guide 80c by the friction element 392. In particular, the friction element 392 includes a friction applying member 418, an initial setting part 420, a cam part 422 and a control lever 424. The initial setting part 420 is adjustably mounted to the housing of the movable member 80b. The initial setting part 420 is positioned to contact one of the movable end portions of the friction element 392, while the other movable end portion of the friction element 392 contacts the cam part 422. The cam part 422 is fixed to the control lever 424 such that rotation of the control lever 424 rotates the cam part 422. This rotation of the cam part 422 squeezes the movable end portions of the friction element 392 to increase the rotational resistance on the rotational shaft 390 when the control lever 424 is pivoted in a counterclockwise direction in FIG. 19. Conversely, when the control lever 424 is pivoted in a clockwise direction in FIG. 20, the rotational resistance on the rotational shaft 390 is decreased because the movable end portions of the friction element 392 spread apart.

Figure 24:
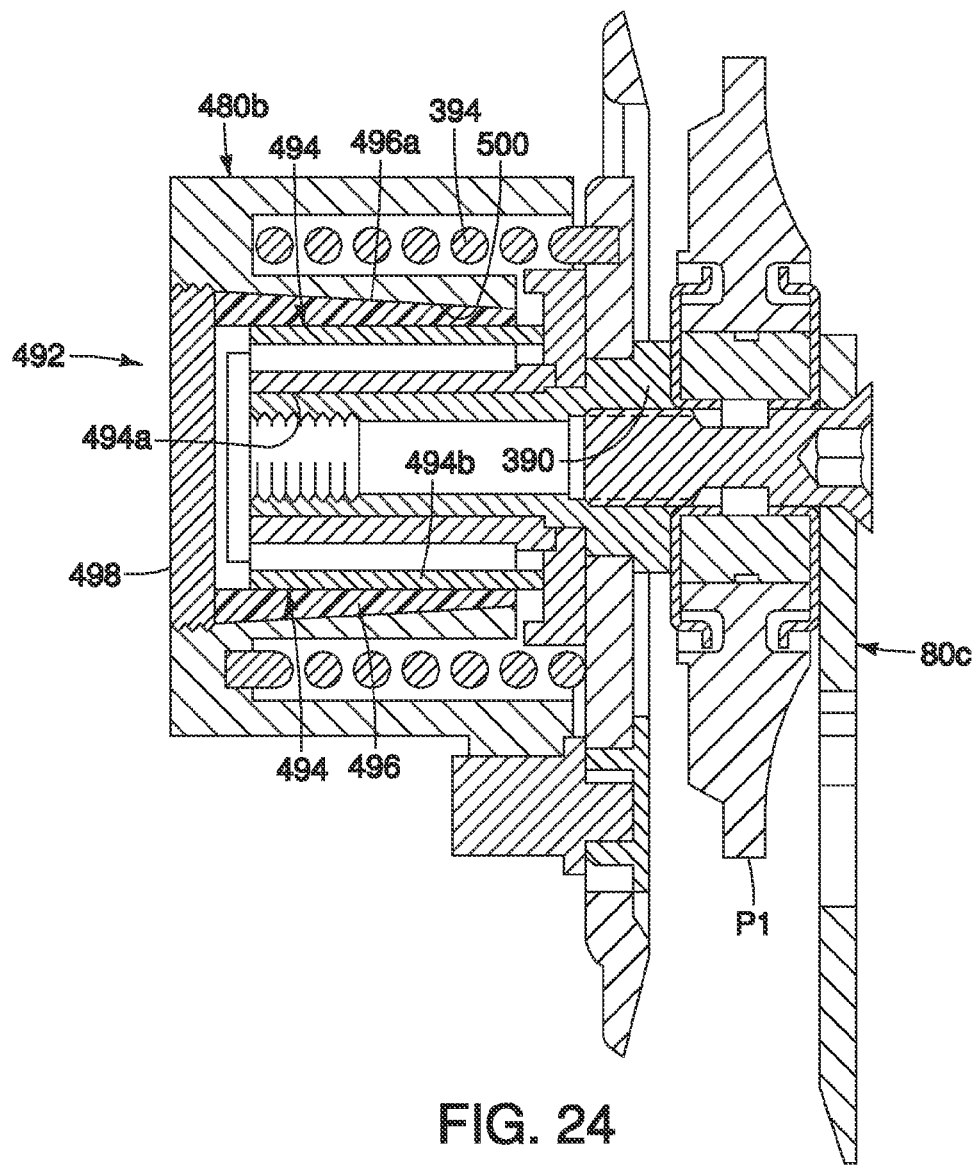
FIG. 24 is a cross sectional view of a movable member with an alternate friction element for use with the rear derailleur illustrated in FIGS. 7 to 14.
Figure 25:
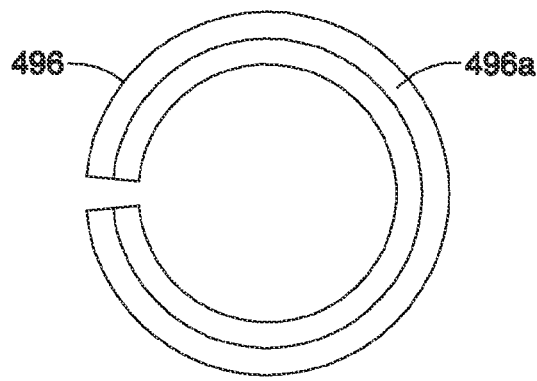
FIG. 25 is an end view of a part of the alternate friction element illustrated in FIG. 24.

As seen in FIG. 24, a movable member 480b with an alternate friction element 492 is illustrated. This movable member 480b is used in the rear derailleur 80, and thus, replaces the movable member 80b of the rear derailleur 80. Basically, the movable member 480b movably mounted on the rotational shaft 390 of the chain guide 80c as in the prior embodiment. Here, in this embodiment, the friction element 492 basically includes a one way roller clutch unit 494, a friction sleeve 496 and an adjustment bolt 498. The roller clutch unit 494 is disposed directly on the rotational shaft 190 The friction sleeve 496 is disposed between the roller clutch unit 494 and an inner surface 500 of the movable member 480b. The roller clutch unit 494 includes an inner race 494a contacting the rotational shaft 390 and an outer race 494b contacting an inner surface of the friction sleeve 496. The friction sleeve 496 is a split sleeve made of a resin material with its outer surface 496a being tapered. Alternatively, the inner surface of the friction sleeve 496 can be tapered. In any case, the adjustment bolt 498 is threaded into the movable member 480b to adjust the amount of friction between the outer race 494b and the friction sleeve 496 With this arrangement, the operation energy of the motor 372 is substantially equal for moving the movable member toward the low gear position and the top gear position. In other words, the friction element 492 increases an operation energy of the motor 372 as the motor 372 moves the movable member 480b toward the low gear position with respect to the base member 80b.

The friction element 492 frictionally provides a rotational resistance in the first rotational direction D1 of the chain guide 80c. So the operation energy of an inward shift of the chain guide 80c towards the low gear position is larger than the operation energy of the outward shift of the chain guide 80c towards the top gear position. However, since the chain guide 80c is biased to the low gear position by the first biasing element 384, the operation energy of the motor 372 for an inward shift and an outward shift can be balance to be identical (i.e., the same within normal manufacturing tolerances). Therefore a reduction ratio of a gear unit of the motor 372 becomes small and the derailleur can be more compact.

Figure 26:
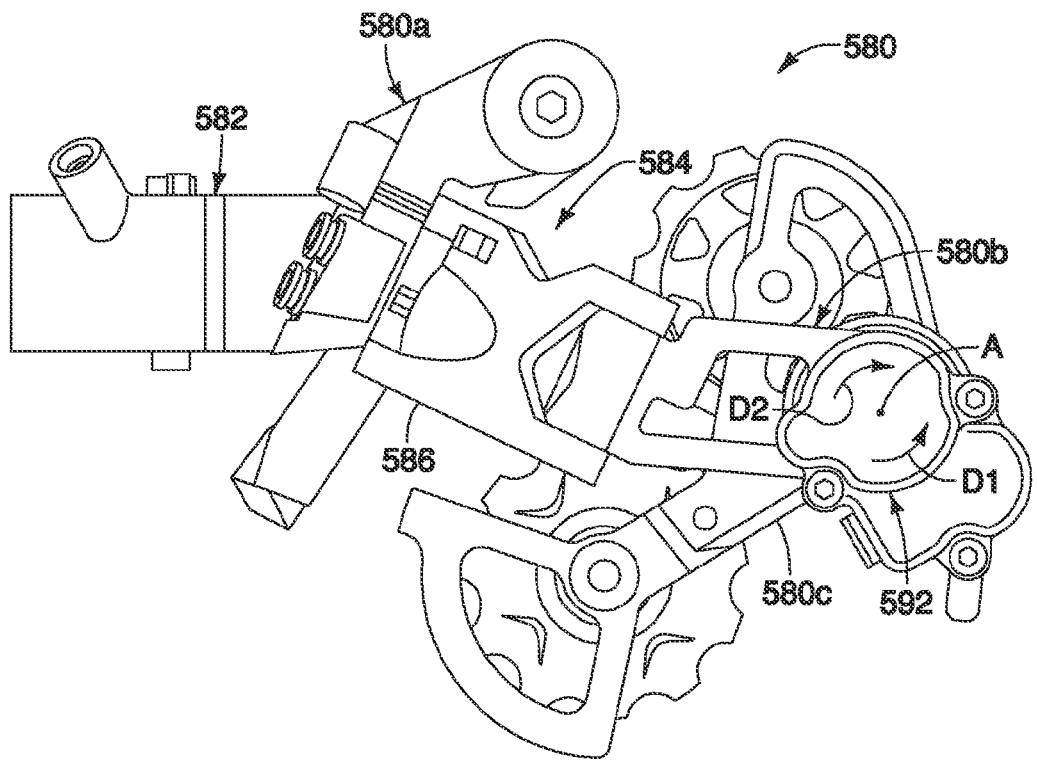
FIG. 26 is a non-frame side elevational view of a rear derailleur in accordance with another embodiment.
Figure 27:
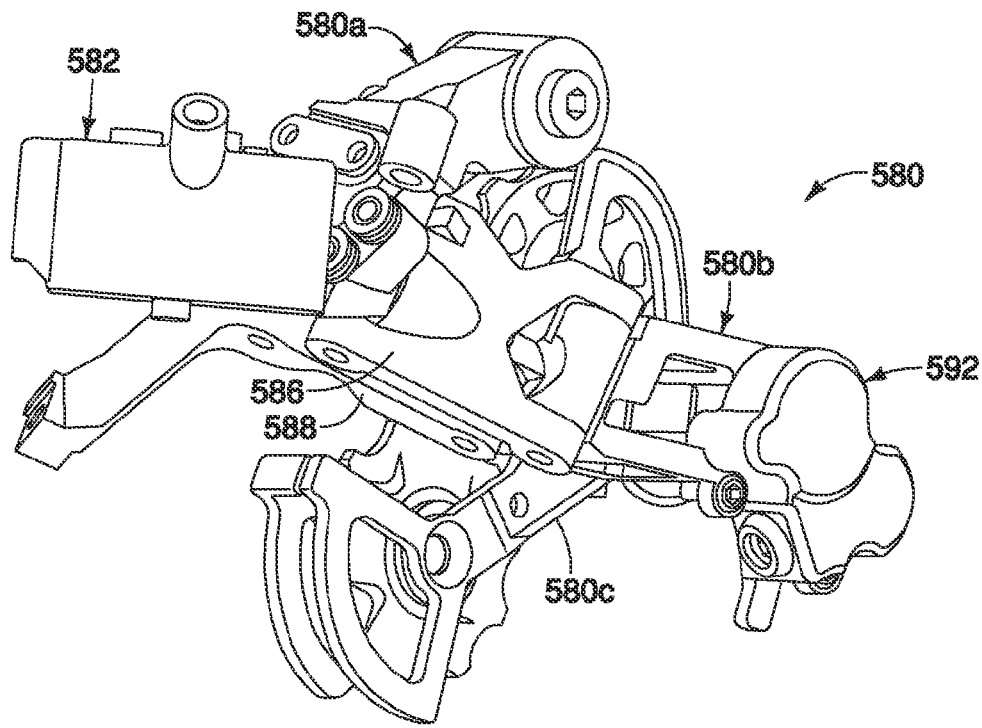
FIG. 27 is a rear perspective view of the rear derailleur illustrated in FIG. 26.
Figure 28:
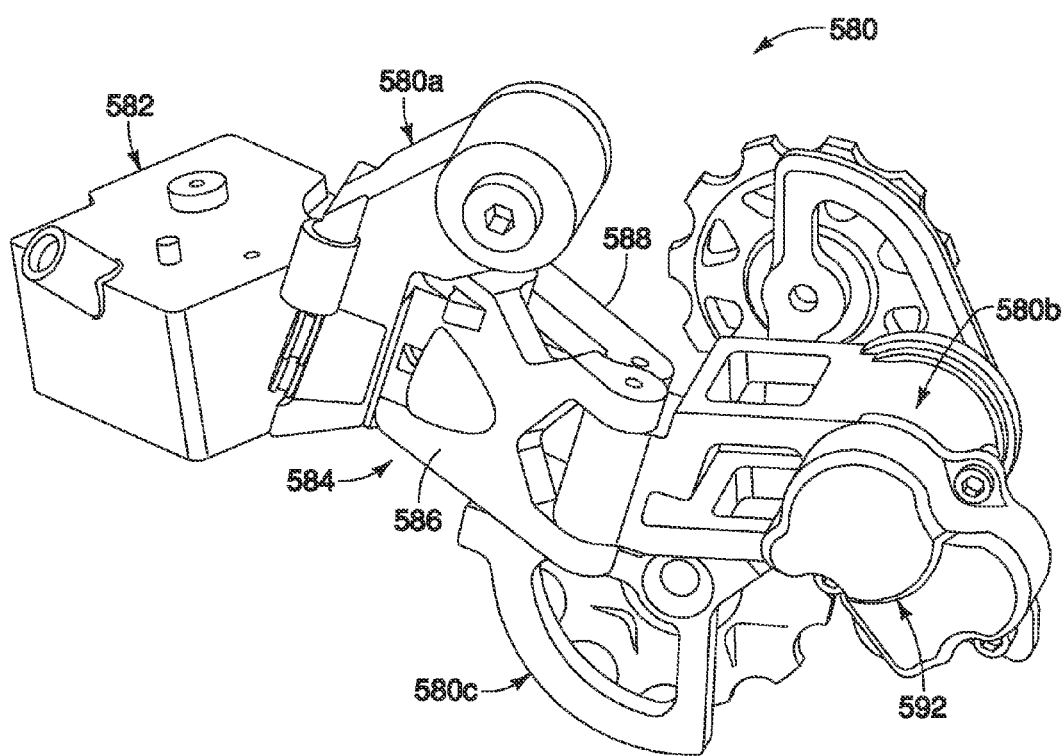
FIG. 28 is a top perspective view of the rear derailleur illustrated in FIGS. 26 and 27.

Referring to FIGS. 26 to 28, a rear derailleur 580 is illustrated in accordance with another embodiment. The rear derailleur 580 includes a base member 580a, a movable member 580b movably coupled to the base member 580a, and a chain guide 580c coupled to the movable member 580b for rotation around the rotational axis A. Here, the rear derailleur 580 is provided with a motor 582 for moving the movable member 580b relative to the base member 580a. The motor 582 is mounted to the base member 580a. The rear derailleur 580 further includes a linkage 584 for movably coupling the movable member 580b to the base member 580a. In other words, the movable member 580b is movably coupled to the base member 580a via the linkage 584. The motor 582 has an output shaft (not shown) that is coupled to the linkage 584 to move the movable member 580b relative to the base member 580a between a low gear position and a top gear position.

The linkage 584 preferably includes a first link 586 and a second link 588. The first and second links 586 and 588 have first ends pivotally connected to the base member 580a and second ends pivotally connected to the movable member 580b to define a four bar linkage arrangement. Similar to the rear derailleur 80, a first biasing element biases the movable member 580b and the chain guide 580c toward a low gear position with respect to the base member 580a.

Here, the first and second links 586 and 588 are arranged such that their pivot axes are not slanted. In this way, a "non-slant parallelogram" is form with respect to the lateral movement of the chain guide 580c such that the chain guide 580c only moves horizontally as the chain guide 580c moves between the low gear position and the top gear position. In other words, the rear derailleur 580 is a non-slanted. On the other hand, the rear derailleur 80 is a slanted derailleur in which the chain guide 80c moves both horizontally and vertically as the chain guide 80c moves between the low gear position and the top gear position.

The constructions of the movable member 580b and the chain guide 580c are the same as the constructions of the movable member 80b and the chain guide 80c. Thus, the movable member 580b and the chain guide 580c will not be further discussed. Also, a friction element 592 is operatively arranged between the movable member 580b and the chain guide 580c to frictionally provide rotational resistance in the first rotational direction D1 of the chain guide 580c. The friction element 592 is the same as the friction element 392 as discussed above.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
   a base member configured to be mounted to a bicycle;
   a movable member movably coupled to the base member;
   a chain guide coupled to the movable member to rotate around a rotational axis with respect to the movable member;
   a rotational shall fixed to the chain guide and rotatably coupled to the movable member about the rotational axis;
   a friction element disposed on the movable member around the rotational shaft, the friction element having a friction applying member operatively arranged between the movable member and the rotational shaft to frictionally provide rotational resistance in a first rotational direction of the chain guide, the friction element including a friction adjusting member that contacts the friction applying member and is rotatably mounted on the movable member between at least a first position and a second position, the rotational resistance being larger with the friction adjusting member in the first position than in the second position;

a one-way clutch disposed between the friction element and the rotational shaft; and a motor operatively coupled to the movable member to move the movable member with respect to the base member.

2. The bicycle derailleur according to claim 1, wherein the first rotational direction is a counterclockwise rotational direction of the chain guide around the rotational axis while being viewed along the rotational axis from a non-frame facing side of the movable member.

3. The bicycle derailleur according to claim 1, further comprising a first biasing element biasing the movable member and the chain guide toward a gear position with respect to the base member.

4. The bicycle derailleur according to claim 3, wherein the first rotational direction is a counterclockwise rotational direction of the chain guide around the rotational axis while being viewed along the rotational axis from a non-frame facing side of the movable member.

5. The bicycle derailleur according to claim 3, wherein the friction element increases an operation energy of the motor as the motor moves the movable member toward the low gear position with respect to the base member.

6. A bicycle derailleur comprising:

a base member configured to be mounted to a bicycle;

a movable member movably coupled to the base member;

a chain guide coupled to the movable member to rotate around a rotational axis with respect to the movable member;

a rotational shaft fixed to the chain guide and rotatably coupled to the movable member about the rotational axis;

a first biasing element biasing the movable member and the chain guide toward a low gear position with respect to the base member;

a friction element operatively arranged between the movable member and the chain guide to frictionally provide rotational resistance in a first rotational direction of the chain guide;

a roller clutch provided as a one-way clutch disposed between the friction element and the rotational shaft, the rotational shaft including an inner race of the one-way clutch; and a motor operatively coupled to the movable member to move the movable member with respect to the base member, the friction element increasing an operation energy of the motor as the motor moves the movable member toward the low gear position with respect to the base member, the first biasing element and the friction element being configured such that the operation energy of the motor is substantially equal for moving the movable member toward the low gear position and the top gear position.

7. The bicycle derailleur according to claim 1, further comprising a second biasing element biasing the chain guide around the rotational axis in a second rotational direction which is opposite to the first rotational direction.

8. The bicycle derailleur according to claim 7, wherein the first rotational direction is a counterclockwise rotational direction of the chain guide around the rotational axis while being viewed along the rotational axis from a non-frame facing side of the movable member.

9. The bicycle derailleur according to claim 1, further comprising a linkage movably coupling the movable member to the base member.

10. The bicycle derailleur according to claim 1, wherein the motor is mounted to the base member, and the motor has an output shaft coupled to the linkage to move the movable member between a low gear position and a top gear position.

11. The bicycle derailleur according to claim 1, wherein the rotational shaft includes an inner race of the one-way clutch.

12. The bicycle derailleur according to claim 1, wherein the friction element applies friction to an outer peripheral surface of an outer race of the one-way clutch.

\* \* \* \* \*